(12) United States Patent
Flynn et al.

(10) Patent No.: US 12,097,511 B2
(45) Date of Patent: Sep. 24, 2024

(54) PROCESS FOR SEPARATION OF DRY FOOD AND FEED MATERIALS USING A TRIBO-ELECTROSTATIC SEPARATOR DEVICE

(71) Applicant: SEPARATION TECHNOLOGIES LLC, Needham, MA (US)

(72) Inventors: Kyle P. Flynn, Ashland, MA (US); Abhishek Gupta, Cambridge, MA (US); Frank J. Hrach, Jr., Mansfield, MA (US)

(73) Assignee: SEPARATION TECHNOLOGIES LLC, Needham, MA (US)

( * ) Notice: Subject to any disclaimer, the term of this patent is extended or adjusted under 35 U.S.C. 154(b) by 732 days.

(21) Appl. No.: 16/642,368

(22) PCT Filed: Aug. 28, 2018

(86) PCT No.: PCT/US2018/048241
§ 371 (c)(1),
(2) Date: Feb. 26, 2020

(87) PCT Pub. No.: WO2019/046234
PCT Pub. Date: Mar. 7, 2019

(65) Prior Publication Data
US 2020/0238300 A1 Jul. 30, 2020

Related U.S. Application Data

(60) Provisional application No. 62/551,008, filed on Aug. 28, 2017, provisional application No. 62/612,804, filed on Jan. 2, 2018.

(51) Int. Cl.
*B03C 7/08* (2006.01)
*A23J 1/00* (2006.01)
(Continued)

(52) U.S. Cl.
CPC .............. *B03C 7/006* (2013.01); *A23J 1/006* (2013.01); *A23J 1/02* (2013.01); *A23J 1/04* (2013.01);
(Continued)

(58) Field of Classification Search
CPC .... B03C 7/006; A23J 1/006; A23J 1/02; A23J 1/04; A23J 1/10; A23J 1/12; A23J 1/146;
(Continued)

(56) References Cited

U.S. PATENT DOCUMENTS 4,839,032 A 6/1989 Whitlock
4,874,507 A 10/1989 Whitlock
(Continued)

FOREIGN PATENT DOCUMENTS

CN 1243457 A 2/2000
CN 1883808 A 12/2006
(Continued)

OTHER PUBLICATIONS

Wood, S.G. et al., "Seed Lipid Content and Fatty Acid Composition of Three Quinoa Cultivars", Journal of Food Composition and Analysis, vol. 6, No. 1, pp. 41-44 (1993).
(Continued)

*Primary Examiner* — Hamid R Badr
(74) *Attorney, Agent, or Firm* — Lando & Anastasi, LLP

(57) ABSTRACT

A tribo-electro static separation process and system for the preparation of various food and feed products. A tribo-electric separation process and system for fractionating a feed mixture comprising at least two members of the group of proteins, starches, soluble and insoluble fibers. Namely, supplying a feed mixture comprising at least two of the group of proteins, starches, soluble and insoluble fibers to a tribo-electric separator and simultaneously charging and separating the feed mixture into at least two subfractions,
(Continued)

with one of the subfractions enriched in one of protein, starch and fiber and having a composition different than the feed mixture.

13 Claims, 11 Drawing Sheets

(51) Int. Cl.

| | |
|---|---|
| *A23J 1/02* | (2006.01) |
| *A23J 1/04* | (2006.01) |
| *A23J 1/10* | (2006.01) |
| *A23J 1/12* | (2006.01) |
| *A23J 1/14* | (2006.01) |
| *A23K 10/22* | (2016.01) |
| *A23K 10/26* | (2016.01) |
| *A23K 10/30* | (2016.01) |
| *A23L 7/10* | (2016.01) |
| *A23L 11/00* | (2021.01) |
| *A23L 13/20* | (2016.01) |
| *A23L 17/10* | (2016.01) |
| *A23L 25/00* | (2016.01) |
| *B03C 7/00* | (2006.01) |
| *C08B 30/04* | (2006.01) |

(52) U.S. Cl.
CPC .  *A23J 1/10* (2013.01); *A23J 1/12* (2013.01); *A23J 1/146* (2013.01); *A23K 10/22* (2016.05); *A23K 10/26* (2016.05); *A23K 10/30* (2016.05); *A23L 7/115* (2016.08); *A23L 7/198* (2016.08); *A23L 11/05* (2016.08); *A23L 13/20* (2016.08); *A23L 17/10* (2016.08); *A23L 25/30* (2016.08); *B03C 7/08* (2013.01); *C08B 30/046* (2013.01); *A23V 2002/00* (2013.01)

(58) Field of Classification Search
CPC ........ A23K 10/22; A23K 10/26; A23K 10/30; A23L 7/115; A23L 7/198; A23L 11/05; A23L 13/20; A23L 17/10
USPC .......................................................... 426/239
See application file for complete search history.

(56) References Cited

U.S. PATENT DOCUMENTS

| | | | |
|---|---|---|---|
| 5,704,490 A | | 1/1998 | Reynard |
| 5,904,253 A | * | 5/1999 | Cerullo .................. B03C 7/08 209/128 |
| 6,365,856 B1 | | 4/2002 | Whitelaw |
| 2011/0289923 A1 | * | 12/2011 | Bittner .................. B01D 53/64 95/134 |
| 2015/0140185 A1 | * | 5/2015 | Rajabzadeh .............. A23L 5/30 426/239 |
| 2016/0143346 A1 | | 5/2016 | Pandya et al. |
| 2016/0310957 A1 | | 10/2016 | Barakat et al. |
| 2016/0369305 A1 | | 12/2016 | Piriou et al. |
| 2021/0086196 A1 | | 3/2021 | Gupta et al. |

FOREIGN PATENT DOCUMENTS

| | | | |
|---|---|---|---|
| CN | 103079707 | A | 5/2013 |
| DE | 19912462 | A1 | 2/2000 |
| EP | 1007215 | B1 | 8/2002 |
| EP | 1908355 | A1 | 4/2008 |
| GB | 2290246 | A | 12/1995 |
| RU | 2152263 | C1 | 7/2000 |
| RU | 2163168 | C2 | 2/2001 |
| RU | 2005129101 | A | 1/2006 |
| RU | 2295393 | C2 | 3/2007 |
| RU | 2577869 | C2 | 3/2016 |
| SU | 187678 | A1 | 10/1966 |
| WO | 2019046234 | A1 | 3/2019 |

OTHER PUBLICATIONS

Klinzing, G.E. et al. (1997). Pneumatic Conveying of Solids: A Theoretical and Practical Approach (2nd Ed.). Chapman & Hall. Section 3.5, pp. 78-81.
Tabtabaei, S. et al. (2016). "Solvent-free production of protein-enriched fractions from navy bean flour using a triboelectrification-based approach," Journal of Food Engineering, vol. 174, pp. 21-28.
International Search Report and Written Opinion in application No. PCT/US2018/048241 dated Feb. 14, 19.
International Search Report and Written Opinion in application No. PCT/US2020/032098 dated Aug. 3, 2020.
Kim E.J. et al: "Nutritional Composition, Nitrogen-Corrected True Metabolizable Energy, and Amino Acid Digestibilities of New Corn Distillers Dried Grains With Solubles Produced by New Fractionation Processes", Poul Try Science, vol. 89, No. 1, Jan. 1, 2010 (Jan. 1, 2010), pp. 44-51, XP055939072, Oxford ISSN: 0032-5791, DOI: 10.3382/PS 2009-00196.
Li Song et al: "Comparison of Protein Concentrate, Protein Isolate and Wet Sieving Processes for Enriching DOGS Protein", Journal of the American Oil Chemists Society, vol. 91, No. 5, May 1, 2014 (May 1, 2014), pp. 867-874, XP055939084, DE ISSN: 0003-021 X, DOI: 10.1007/s11746-014-2411-8 Retrieved from the Internet: URL: https://link.springer.com/content/pdf/10.1007/s117 46-014-2411-8.pdf.
Search Report in Chinese application No. 2018800647624.

* cited by examiner

PROCESS FOR SEPARATION OF DRY FOOD AND FEED MATERIALS USING A TRIBO-ELECTROSTATIC SEPARATOR DEVICE

CROSS-REFERENCE TO RELATED APPLICATIONS

This application is a U.S. national phase application and claims the benefit of priority under 35 U.S.C. § 371 of International Patent Application Serial No. PCT/US2018/048241 filed Aug. 28, 2018 and titled "PROCESS FOR SEPARATION OF DRY FOOD AND FEED MATERIALS USING A TRIBO-ELECTROSTATIC SEPARATOR DEVICE", which claims the benefit of priority to U.S. Provisional Patent Application Ser. No. 62/551,008 filed Aug. 28, 2017 and U.S. Provisional Patent Application Ser. No. 62/612,804 filed Jan. 2, 2018, both titled "PROCESS FOR SEPARATION OF DRY FOOD AND FEED MATERIALS USING A TRIBO-ELECTROSTATIC SEPARATOR DEVICE," the entire disclosure of each of which is hereby incorporated herein by reference in its entirety for all purposes.

BACKGROUND

Field of Invention

The present invention relates to a process for upgrading the value of dry, granular food and animal feed materials using a tribo-electrostatic separation process to separate the components of human food and animal feed mixtures based on tribo-electric charging of the particles.

Background of the Invention

Many ingredients used in human food and animal feed are plant-based materials consisting of dry mixtures of mostly proteins, starches, sugars, fibers, fats and oils. The naturally occurring crops are harvested, cleaned, dried, tempered, milled, and purified as required for their ultimate usage as ingredients in human food and animal feed products. The purification process typically consists of dry physical separation based on particle size and/or density, or wet processes that use additional chemicals, alkaline water, acidic water, or other solvents to purify the component of interest and generate by-products that are used as lower value ingredients.

One major category of dry plant-based food and feed ingredients are the cereal grains which includes wheat, barley, oats, rice, rye, corn, millet, sorghum, quinoa, and couscous. The cereal grains typically contain relatively high levels of starches, and relatively low levels of protein, fiber, and oils. Dry processing of the cereal grains generally consists of physical separation according to particles size after milling. The more fibrous outermost tissues of the grain kernel result in larger particles than the starch-rich endosperm fraction after milling. This allows a straightforward separation using sieves or classification methods to produce a fiber-rich bran product and a starch-rich flour product.

A second major category of dry plant-based food and feed ingredients are the pulses (or legumes) which include peas, lima beans, fava beans, lupin beans, and garbanzo beans. The pulses typically contain lower levels of starches and sugars and higher levels of protein than the cereal grains. The oil content of pulses varies among the crops, but it is generally higher than the cereal grains. Pulses are desirable as a food ingredient for humans and animals due to the higher protein content. Significant development work is and has been conducted by the food ingredient industry to develop modified pulse products with enriched protein content for use as a substitute for traditional uses of cereal grains.

A third major category of dry plant-based food and feed ingredients are oilseeds and the meals resulting after removal of the oil for the raw oilseed. Examples of oilseeds are soybean, canola (or rapeseed), sunflower, mustard, sesame, flaxseed, safflower, corn germ, and peanut. The oilseeds are characterized by high oil content, low starch/sugar content, and moderate levels of protein and fiber. The by-product meal resulting after removal of the oil from the raw oilseed is useful as an animal (and potentially a human) feed material. The processing industry is devoting significant effort to develop improved methods of upgrading the protein content from the various oilseed meal by-products.

Another common source of animal feed materials are the by-products of the animal slaughtering and rendering industries, such as fish meal, bone meal, and meat and bone meal (MBM). These by-product materials are a mixture of the bone, which consists of inorganic calcium phosphate minerals, collagen protein, and residual soft tissue protein-rich particles. The composition can be simplified by modelling them as a mixture of protein, bone (as measured by ashing), water, and fats and oils. Animal meals with high protein content can be used as feed for farm animals and for pets. In parts of the world, concerns about Bovine Spongiform Encephalopathy (BSE) limit the use of meat and bone meals as a feed for cattle, however these meals can be used for feed to other animals. Meals with low protein content can be used as a raw material in gelatin production if rigid specification on composition, density, and particle size are met. Meals with low protein content can also be used as an organic fertilizer. Animal meal by-products that cannot meet high protein specifications for animal feed, or specifications for gelatin production or fertilizer are typically either landfilled or incinerated. The renderer will attempt to segregate the raw materials by type to maximize production of high protein (low ash) and low protein (high ash) byproducts to maximize the total value. In cases where the renderer cannot adequately segregate the raw materials, a process where the meal is dry fractionated into high and low ash fractions is desirable.

Food ingredient producers and the general public are interested in improved food ingredients containing for example, higher protein content, reduced gluten, higher soluble fiber content, etc. for the reported health benefits in both humans and animals. However, the process technologies required to produce these improved ingredients should not add incremental risks to health, either real or perceived. For this reason, physical separation processes that do not include the use of solvents or the addition of synthetic chemicals are preferred.

Another benefit of dry, physical separation processes over wet separation processes are that the functionality of protein as a food ingredient is improved because dry separation processes do not require wetting with water or solvents and drying.

Historically, dry separation for food and feed consists of size and density-based processes such as screening or air classification. These separation processes are limited to applicability only for materials where there is a significant difference in particle size and/or density between the components of interest. For example, size-based separation methods are not useful in the separation of wheat gluten from wheat starch where the particle size for both components are similar.

Electrostatic separation processes offer a new approach for separation of dry food ingredients. Electrostatic separation has been applied on the industrial-scale for the past 50 years for the beneficiation of minerals and the recycling of waste materials, but the application to processing of food and feed materials using existing electrostatic separation methods has not yet been demonstrated at commercially significant processing rates.

Electrostatic beneficiation allows for separations based on differences in surface chemistry (work function), electrical conductivity, or dielectric properties. Electrostatic separation systems operate on similar principles. All electrostatic separation systems contain a system to electrically charge the particles, an externally generated electric field for the separation to occur in, and a method of conveying particles into and out the separation device. Electrical charging can occur by one or multiple methods including conductive induction, tribo-charging (contact electrification) and ion or corona charging. Electrostatic separation systems utilize at least one of these charging mechanisms.

Rotating drum electrostatic separation systems have been used in many industries and applications where one component is more electrically conductive than the others. There are multiple variations and geometries used for conductive drum systems, but in general, they operate on similar principles. Feed particles are dispersed onto a rotating drum that is electrically grounded, and then charged by either conductive induction or from an ionizing corona discharge. The electrically conductive particles give up their charge to the surface of the grounded drum. The rotation of the drum causes the conductive particles to be thrown from the surface of the drum and deposited in the first product hopper. The non-conductive particles retain their electrical charge and are pinned to the surface of the drum. Eventually, the electrical charge on the non-conductive particles will dissipate, or the particles will be brushed from the drum, after the drum has rotated so that the non-conductive particles are deposited in the non-conductive particle hopper. In some applications a middlings hopper is placed in between the conductive and non-conductive product hopper. The effectiveness of this type of separation device is limited to particles which are relatively coarse and/or have a high specific gravity, due to the need for all particles to contact the surface of the drum. Particle flow dynamics are also important as angular momentum is ultimately responsible for conveying the particles from the surface of the drum to the respective product hoppers. Fine particles and low-density particles are easily influenced by air currents and thus less likely to be thrown from the drum in a predictable trajectory.

A method of separating fibers from oilseeds using a conductive drum separator is described in European patent application EP1908355 A1. Examples are shown for fiber removal from protein for de-oiled coarse rapeseed with particle size greater than 315 microns. The results of the separation depend on optimizing the feed drying process to achieve a difference in moisture level (and therefore conductivity difference) between the fibers and kernels to be separated. This observation is consistent with all conductive drum devices which are limited to separations based primarily on conductivity differences between components. Application of this type of electrostatic separation device is limited for food and feed applications where the difference in electrical conductivity between mixture components is large.

The conductive belt separator is a variant of the rotating separator described above. Feed particles are dispersed evenly across the width of an electrically grounded conveyor belt. Particles are also charged, either by conductive induction or ion bombardment. Again, the conductive particles give their electrical charge up to the grounded conveyor belt, while the non-conductive particles retain their charge. The conductive particles fall off of the edge of the belt by gravity, while the charged non-conductive particles are "lifted" off of the surface of the belt by electrostatic forces. Again, for the separation to be effective, each particle must contact the surface of the belt to allow for the conductive particles to give up their charge to the belt. Therefore, only a single layer of particles can be conveyed by the separator at one time. As the particle size of the feed becomes smaller, the processing rate of the device is reduced.

A method for separating fibers from corn flour using a conductive belt separator is described in US patent application US20160143346 A1. Examples are shown where fiber is removed from coarse corn flour with particle size greater than 704 microns. As in the case of the rotating drum example, the application of this type of device is limited to relatively coarse particle size, and materials where the mixture components exhibit a difference in electrical conductivity that can be exploited.

Parallel plate electrostatic separators are based upon separating particles not on the basis of conductivity, but on differences in surface chemistry that allows for electrical charge transfer by frictional contact, or tribo-charging. Particles are electrically charged by vigorous contact with other particles, or with a third surface such as a metal or plastic with the desired tribo-charging properties. Materials that are electronegative (located on the negative end of the tribo-electric series) remove electrons from the tribo-charging surface and thus acquire a net negative charge. In contrast, materials that are on the positive end of the tribo-electric series donate electrons and charge positive. The charged particles are then introduced into an electrical field generated between the two parallel plate electrodes by various transportation means (gravity, pneumatic, vibration). In the presence of the electric field, the charged particles are deflected and move towards the oppositely charged electrodes and are collected at the corresponding product hoppers. A middling fraction containing a mixture of particles may be collected, depending on the configuration of the separation device.

A method for processing pulses, grains, oilseeds, and dried fruit using a tribo-charger and a separate vertical parallel plate separator is described in US patent application US20150140185 A1. Examples are shown for separation of protein from starch, and protein from starch and fiber for navy bean flour, quinoa flour, and a synthetic mixture of soy flour and corn starch. Tribo-charging was accomplished in a separate step by contacting the feed particles with a PTFE surface using a custom built "tribo-gun" with internal channels coated with PTFE. After tribo-charging, the feed material was separated using a vertical plate device where 40 mg of each stream was collected, dried, and tested for protein content. The experiments appear to be have been conducted at laboratory-scale. The feed rate used for the experiments was not disclosed.

Another method of separating fiber from protein for oilseed cakes using a two-step tribo-electrostatic separation process is described in US patent application US20160310957 A1. In this process the feed particles are first processed in a tribo-charging step using fluidized air to create electrostatic charges on the moving particles, and then separated using a vertical parallel plate electrostatic sorter where the particles fall and the paths are deviated by the effect of the electric field applied by the vertical parallel plate electrodes. The device is laboratory scale with electrode dimensions 30 cm high×10 cm wide. There is no disclosure of the feed rate used in the device. The vertical electrodes include a means for mechanically scraping the electrodes to remove the particles that adhere to the electrodes during operation. An alternative method of electrode cleaning is described where the polarity of the electric field is periodically reversed to encourage removal the particles that adhere to the electrode during operation. Examples are shown for separation of protein from lignin for sunflower cake and rapeseed cake that was milled to less than 250 micron and both single and twice passed through the separator. Results show significant increase in protein content in the fraction obtained on one of the electrodes and decrease in protein for the fraction obtained on the opposite electrode. It is not disclosed whether the sample collected was scraped from the electrode or collected in a receiver below the device.

The usefulness of vertical plate electrostatic separators for high rate industrial-scale applications is limited by the fundamental physics associated with deviating the path of particles falling through a separation chamber. In the design of a vertical plate separator, there are at least three forces acting on the particles as they are deviated horizontally from the action of an electric field that is perpendicular to the path of a vertically falling individual particle. The gravitational force moves the particle downward is proportional to the cube of the diameter and directly proportional to the particle density for spherical particles. The electrostatic force on a spherical particle in an electric field is proportional to the square of the particle diameter and directly proportional to the electric field strength. The aerodynamic drag for a spherical particle is proportional to the square of the particle velocity and the particle diameter. By considering these forces for a typical electric field strength in a free-fall vertical plate separator, and the maximum surface charge density that can be achieved on a particle surface, one can show that the ratio of horizontal (deflecting) velocity ($v_h$) to vertical (terminal, falling) velocity ($v_t$) will significantly vary with particle size. In one example, the velocity ratio ($v_h/v_t$) will vary from 0.4 for 300 micron particles to 8.0 for 10 micron particles. One can show that the optimum height (H) to electrode gap (G) ratio for a free-fall vertical plate separator is equal to $2 \times v_h/v_t$. Therefore, the optimum dimensions for a free-fall vertical plate separator depends strongly on the feed particle size. A practical designer would choose dimensions suitable for optimum separation of the most frequently occurring particles (the mode of the feed particle size distribution). Particles that are significantly larger than the mode will not deflect significantly at the discharge of the vertical plate separator and must be collected separately in a middling fraction stream that must be re-ground and recycled to the feed. Particles that are significantly finer than the mode will travel to the vertical plate electrode surface and tend to collect and adhere to the electrodes. For this reason, it is not possible to design a vertical plate separator with dimensions that allow efficient separation of the entire range of particle sizes produced when using standard industrial milling equipment.

Another factor that limits the effectiveness of vertical plate separators is the effect of charges on the particles on the effective electric field in the separation zone. This is known as the space charge effect. When charged particles are introduced between electrode plates, the charges on the particles interact with the charges on the electrode plates and reduce the local electric field. The magnitude of this effect can be estimated using Gauss' law, which states that the electric field flux depends on the magnitude of the total net charge in a control volume. As one moves away from the electrode surface, the electric field is reduced by the presence of charged particles between the point and the surface of the electrode. When the charge in space is equal to the charge on the electrode surface, there is no electric field, and therefore no further particle separation for a vertical plate device. This creates a feed rate limitation inherent to vertical plate electrostatic separators for a given electric field strength and a given electrode width.

The fluidization characteristic of powders is one parameter useful for determining how the particles of the powder behave in tribo-electrostatic separators. Section 3.5 in Pneumatic Conveying of Solids by Klinzig G. E. et al., second edition 1997, describes materials loosely as "aeratable" or "cohesive". The cohesive particles are generally those with finer particle size, lower specific gravity, non-spherical particle shape, and higher surface moisture. Finely milled, charged particles behave as a cohesive powder that adhere to inside surfaces of any processing device creating layers that can build-up over time. Cohesive powders adhere especially well to the surface of the electrodes needed to create the electric field in an electro-static separator. The build-up of cohesive powders on the surface of the electrodes disrupts the applied electric field and results in a deterioration of separation performance. As a result, it is necessary that some type of electrode scraping, or cleaning, mechanism be used to allow for continuous operation of vertical plate separators. This mechanism is complex due to the requirements of electrical isolation of the required high voltage. Furthermore, many bench-top vertical plate separator experiments are conducted in a batch mode where product samples are collected by opening the separator chamber after the experiment and scraping material that has been collected on the electrodes for analysis. This type of results does not allow prediction of separation performance under continuous operation.

To overcome some of the limitations of vertical plate electrostatic separators, the tribo-electric belt separator (TBS) has been developed by commonly-owned Assignee of this application. FIG. 1 shows a tribo-electric belt separator system 10 such as is disclosed in commonly-owned U.S. Pat. Nos. 4,839,032 and 4,874,507, which are hereby incorporated herein by reference in their entirety for all purposes. Tribo-electric belt separators (TBS) are used to separate the constituents of particle mixtures in the minerals and recycling industries. One embodiment of belt separator system 10 includes parallel spaced electrodes 12 and 14/16 arranged in a longitudinal direction to define a longitudinal centerline 18, and a belt 20 traveling in the longitudinal direction between the spaced electrodes, parallel to the longitudinal centerline. The belt 20 forms a continuous loop which is driven by a pair of end rollers 22, 24. A particle mixture is loaded onto the belt 20 at a feed area 26 between electrodes 14 and 16. Belt 20 includes counter-current traveling belt segments 28 and 30 moving in opposite directions for transporting the constituents of the particle mixture along the lengths of the electrodes 12 and 14/16. The only moving part of the TBS is the belt 20. The belt is therefore a critical component of the TBS. The belt 20 moves at a high speed, for example, up to about 20 m/s. The two belt segments 28, 30 move in opposite directions, parallel to centerline 18, and thus if they come into contact, the relative velocity is about 40 m/s.

SUMMARY

Aspects of the present disclosure are directed to a tribo-electric separation process and system for fractionating a feed mixture comprising at least two members of the group of proteins, starches, soluble and insoluble fibers. In particular, at least one embodiment of the process includes: supplying a feed mixture comprising at least two of the group of proteins, starches, soluble and insoluble fibers to a tribo-electric separator; and simultaneously charging and separating the feed mixture into at least two sub-fractions, with one of the subfractions enriched in one of protein, starch and fiber and having a composition different than the feed mixture.

Embodiments of the feed mixture can include any of carbohydrates such as mono-di-oligo or poly saccharides, other sugars micronutrients, phytochemicals, vitamins, trace elements and oils.

Embodiments of the process include operating a tribo-electrostatic belt separator to fractionate the feed mixture.

At least one embodiment of the system includes a tribo-electric belt-type separator include a first electrode and a second electrode arranged on opposite sides of a longitudinal centerline and configured to provide an electric field between the first and second electrodes; at least one first roller disposed at a first end of the separator and at least one second roller disposed at a second end of the separator; a continuous belt disposed between the first and second electrodes and supported by the at least one first roller and the at least one second roller; and a separation zone defined by and between the continuous belt.

Embodiments of the process and apparatus can be used to separate protein particles from fiber and starch particles for a feed mixture with protein level between 1 to 99%; starch levels between 1 to 99%; the fiber levels between 1 to 99%; the oil content is less than 20%, and moisture content is less than 30%.

At least one embodiment of the process and apparatus is provided wherein the protein level of one of the sub-fractions is enriched to be anywhere in a range of 4% to 90%.

At least one embodiment of the process and apparatus is provided wherein the protein level of one of the sub-fractions is enriched to be anywhere in the range of 25% to 46.5%.

At least one embodiment of the process and apparatus is provided wherein the protein level of one of the sub-fractions is enriched to be anywhere in the range of 4% to 51%.

At least one embodiment of the process and apparatus is provided wherein the starch levels of one of the sub-fractions is enriched to be anywhere in a range of 36% to 88%.

At least one embodiment of the process and apparatus is provided wherein the fibers levels of one of the sub-fractions is enriched to be anywhere in a range of 27% to 51%.

At least one embodiment of the process and apparatus is provided wherein the fiber level of one of the sub-fractions is enriched by at least a relative change of 5%.

At least one embodiment of the process and apparatus result is provided wherein the starch level of one of the sub-fractions is enriched by at least a relative change of 5%.

At least one embodiment of the process and apparatus is provided wherein the particle size can be anywhere in a range from 12 micron to 400 microns.

At least one embodiment of the process and apparatus is provided wherein the moisture percentage can be anywhere from 5% to 8%.

At least one embodiment of the process and apparatus is provided wherein the oil percentage content can be anywhere from 0.7% to 4.7%.

At least one embodiment of the process and apparatus is provided wherein the feed mixture can be processed at a rate of anywhere in a range of 1000 to 17,000 kg per hour per meter of electrode width.

At least one embodiment of the process and apparatus is provided wherein the belt speed can be anywhere in a range of 10 to 70 feet per second.

At least one embodiment of the process and apparatus is provided wherein the electric field strength can be anywhere in a range of 120 to 4,000 kV/m.

At least one embodiment of the process and apparatus is provided wherein starch particles are separated from fiber and protein particles for feed mixtures with starch level between for 1 to 99%; the protein level between 1 and 99%; the fiber level between 1 to 99%; the oil content is less than 20%, and the moisture content less than 30%.

At least one embodiment of the process and apparatus is provided wherein the starch level of one of the subfractions is enriched by at least a relative change of 5%.

At least one embodiment of the process and apparatus is provided wherein the fiber level of one of the sub-fractions is enriched by at least a relative change of 5%.

At least one embodiment of the process and apparatus is provided wherein the protein level of one of the sub-fractions is enriched by at least a relative change of 5%.

At least one embodiment of the process and apparatus is provided wherein the starch levels of one of the sub-fractions is enriched to be anywhere in a range of 36% to 88%.

At least one embodiment of the process and apparatus is provided wherein the starch levels of one of the sub-fractions is enriched to be anywhere in a range of 16% to 45%.

At least one embodiment of the process and apparatus is provided wherein the particle size can be anywhere in a range anywhere from 12 micron to 92 microns.

At least one embodiment of the process and apparatus is provided wherein the particle size can be anywhere in a range anywhere from 600 micron to 1700 micron.

At least one embodiment of the process and apparatus is provided wherein the moisture percentage can be anywhere from 0.2% to 11.5%.

At least one embodiment of the process and apparatus is provided wherein the oil percentage content can be anywhere from 0.6 to 9.6%.

At least one embodiment of the process and apparatus is provided wherein, the belt speed can be anywhere in a range of 10 to 70 feet per second.

At least one embodiment of the process and apparatus is provided wherein the electric field strength can be anywhere in a range of 120 to 4,000 kV/m.

At least one embodiment of the process and apparatus is provided wherein the moisture percentage can be anywhere between 0% and 30%, preferably between 0.2 and 11%.

At least one embodiment of the process and apparatus is provided wherein there is no adjustment of feed moisture prior to separation.

At least one embodiment of the process and apparatus is provided wherein there is an adjustment of feed moisture prior to separation by one of drying or wetting.

At least one embodiment of the process and apparatus is provided wherein the belt speed can be anywhere in a range between 10 and 70 feet per second, preferably between 45 and 65 feet per second.

At least one embodiment of the process and apparatus is provided wherein the voltage applied to the electrodes of the apparatus and process electrodes can be anywhere in range between 3 kV and 20 kV, preferably between 10 and 16 kV.

At least one embodiment of the process and apparatus is provided wherein the electric field strength can be anywhere in a range of 120 to 4,000 kV/m.

At least one embodiment of the process and apparatus is provided wherein the gap between the electrodes is continuously adjustable and can be varied anywhere in a range between 0.5 to 2.5 cm, preferably between 0.9 to 1.7 cm.

At least one embodiment of the process and apparatus is provided wherein the feed mixture comprises cereal grains including any of wheat, barley, oats, rice, rye, corn, millet, sorghum, quinoa, and couscous.

At least one embodiment of the process and apparatus is provided wherein the feed mixture comprises pulses (or legumes) including any of peas, lima beans, fava beans, lupin beans, and garbanzo beans.

At least one embodiment of the process and apparatus is provided wherein the feed mixture comprises oilseeds and meals resulting after removal of the oil for raw oilseed, including any of soybean, canola, rapeseed, sunflower, mustard, sesame, flaxseed, safflower, corn germ, and peanut.

Aspects of the disclosure include a subfraction enriched in one of protein, starch and fiber and separated according to any of the preceding claims.

Aspects of the disclosure include a process for fractionating a feed mixture having a moisture content and oil content and comprising proteins and ash-rich bone particles using a tribo-electrostatic separation process. The process may comprise: supplying said mixture comprising proteins and ash-rich bone particles to a tribo-electric separator, simultaneously charging and separating said feed mixture into at least two subfractions, with one of the subfractions enriched in one of protein and ash and having a composition different than the feed mixture.

At least one embodiment of the process further comprises continuously operating a tribo-electrostatic belt separator to fractionate the feed mixture, the tribo-electrostatic belt separator comprising: a first electrode and a second electrode arranged on opposite sides of a longitudinal centerline and configured to provide an electric field between the first and second electrodes; at least one first roller disposed at a first end of the separator; at least one second roller disposed at a second end of the separator; a continuous belt disposed between the first and second electrodes and supported by the at least one first roller and the at least one second roller; and a separation zone defined by and between the continuous belt.

At least one embodiment of the process is provided wherein protein particles are separated from ash-rich bone particles for a feed mixture with a protein level between 1 to 99%; ash levels between 1 to 99; oil content is less than 20%, and moisture content is less than 30%.

At least one embodiment of the process is provided wherein the protein level of one of the sub-fractions is enriched to be anywhere in a range of 41% to 66%.

At least one embodiment of the process is provided wherein the protein level of one of the sub-fractions is enriched to be anywhere in the range of 55% to 80%.

At least one embodiment of the process is provided wherein the ash levels of one of the sub-fractions is enriched to be anywhere in a range of 50% to 54%.

At least one embodiment of the process is provided wherein the ash levels of one of the sub-fractions is enriched to be anywhere in a range of 18% to 39%.

At least one embodiment of the process is provided wherein the protein level of one of the subfractions is enriched by at least a relative change of 5%.

At least one embodiment of the process is provided wherein the ash level of one of the subfractions is enriched by at least a relative change of 5%.

At least one embodiment of the process is provided wherein the mixture comprises meals derived from the processing of animals, such as cattle, pigs, poultry, and fish, which includes any of bone meal, meat meal, meat and bone meal, and fish meal.

Aspects of the disclosure include a sub-fraction enriched in one of protein and ash and separated according to any of the embodiments of the process.

Aspects of the disclosure include a tribo-electric separation system. The system may comprise: a source of a feed stream, wherein the feed stream comprises a plant-based or an animal by-product feed; and a tribo-electric belt-type separator, the tribo-electric belt-type separator comprising: a feed inlet in fluid communication with the source of the feed stream; a first electrode and a second electrode configured to provide an electric field between the first and second electrodes; at least one first roller disposed at a first end of the separator; at least one second roller disposed at a second end of the separator; a continuous belt disposed between the first and second electrodes and supported by the at least one first roller and the at least one second roller; a first product stream outlet; and a second product stream outlet.

At least one embodiment of the system provides that the feed stream comprises at least one constituent selected from the group consisting of: proteins, gluten, starches, soluble fibers, and insoluble fibers.

At least one embodiment of the system provides a plant-based feed that comprises one or more of cereal grains, pulses, and/or oil seeds.

At least one embodiment of the system provides that the feed stream comprises cereal grains including any of wheat, barley, oats, rice, rye, corn, millet, sorghum, quinoa, and couscous.

At least one embodiment of the system provides that the feed stream comprises pulses or legumes including any of peas, lima beans, fava beans, lupin beans, and garbanzo beans.

At least one embodiment of the system provides that the feed stream comprises oilseeds and/or meals resulting after removal of the oil for raw oilseed, including any of soybean, canola, rapeseed, sunflower, mustard, sesame, flaxseed, safflower, corn germ, and peanut.

At least one embodiment of the system provides that the animal by-product feed comprises bovine bone meal, gel bone lights, or fish meal.

At least one embodiment of the system provides that the feed stream is not any of pre-processed, separated based on particle size and/or density.

At least one embodiment of the system provides that the feed stream is not defatted or dehydrated.

At least one embodiment of the system provides that the feed stream is pre-processed with a dry separation technique.

At least one embodiment of the system provides that the feed stream is defatted or dehydrated.

At least one embodiment of the system provides that the feed stream is associated with a D10-D90 particle size range of about 0.1 micron to about 2000 micron, i.e. a D10-D90 particle size range of about 0.1 micron to about 1000 micron, i.e. a D10-D90 particle size range of about 0.5 micron to about 500 micron, i.e. a D10-D90 particle size range of about 1 micron to about 300 micron, i.e. a D10-D90 particle size range of about 10 micron to about 90 micron, i.e. a D10-D90 particle size range of about 1 micron to about 10 micron.

At least one embodiment of the system provides that a first product stream associated with the first product stream outlet has a D10-D90 particle size range of about 0.1 micron to about 2000 micron, i.e. a D10-D90 particle size range of about 0.1 micron to about 1000 micron, i.e. a D10-D90 particle size range of about 0.5 micron to about 500 micron, i.e. a D10-D90 particle size range of about 1 micron to about 300 micron, i.e. a D10-D90 particle size range of about 10 micron to about 90 micron, i.e. a D10-D90 particle size range of about 1 micron to about 10 micron.

At least one embodiment of the system provides that the first product stream has a D10-D90 particle size range of about 1 micron to about 500 microns, i.e. a D10-D90 particle size range of about 10 microns to about 100 microns.

At least one embodiment of the system provides that a second product stream associated with the second product stream outlet has a D10-D90 particle size range of about 0.1 micron to about 2000 micron, i.e. a D10-D90 particle size range of about 0.1 micron to about 1000 micron, i.e. a D10-D90 particle size range of about 0.5 micron to about 500 micron, i.e. a D10-D90 particle size range of about 1 micron to about 300 micron, i.e. a D10-D90 particle size range of about 10 micron to about 90 micron, i.e. a D10-D90 particle size range of about 1 micron to about 10 micron.

At least one embodiment of the system provides that the second product stream has a D10-D90 particle size range of about 1 micron to about 500 microns, i.e. a D10-D90 particle size range of about 10 microns to about 150 microns.

At least one embodiment of the system provides that the plant-based or an animal by-product feed is characterized by its natural oil level and/or a natural moisture level.

At least one embodiment of the system provides that the natural oil level is less than about 10%, preferably less than about 5%, and more preferably less than about 1%

At least one embodiment of the system provides that the natural moisture level is less than about 15%, preferably less than about 10%, more preferably less than about 1%, and most preferably less than about 0.5%.

At least one embodiment of the system provides that the separator device has a throughout rate of at least about 2000 kg/hr/meter of electrode width, preferably at least about 3500 kg/hr/meter of electrode width, more preferably at least about 5000 kg/hr/meter of electrode width, even more preferably at least about 7500 kg/hr/meter of electrode width, even more preferably at least about 10,000 kg/hr/meter of electrode width, even more preferably at least about 15,000 kg/hr/meter of electrode width, most preferably at least about 20,000 kg/hr/meter of electrode width.

At least one embodiment of the system is configured to yield a starch recovery of at least about 90% at the first product stream outlet, and further configured to yield a protein recovery rate of at least about 70% at the second product stream outlet with respect to a wheat-gluten and wheat-starch feed stream at the feed inlet.

At least one embodiment of the system is configured to yield a fiber recovery of at least about 60% at the first product stream outlet, and further configured to yield a protein recovery rate of at least about 65% at the second product stream outlet with respect to a sunflower seed meal feed stream at the feed inlet.

At least one embodiment of the system is configured to yield a protein recovery of at least about 55% at a product stream outlet with respect to an extracted rapeseed meal feed stream at the feed inlet.

At least one embodiment of the system is configured to yield a fiber-enriched product stream having a fiber content of at least about 55% at the first product stream outlet and a starch-enriched product stream having a starch content of at least about 65% at the second product stream outlet relative to the feed inlet.

At least one embodiment of the system is configured to yield a fiber-enriched product stream having a total fiber content of at least about 20%, i.e. at least about 40% at the first product stream outlet and a starch-enriched product stream having a starch content of at least about 40%, i.e. at least about 65% at the second product stream outlet relative to the feed inlet.

At least one embodiment of the system is configured to yield a protein-enriched product stream having a protein content of at least about 55% with respect to a lupin flour feed stream at the feed inlet.

At least one embodiment of the system is configured to yield a protein-enriched product stream having a protein content of at least about 60% with respect to a pea protein concentrate feed stream at the feed inlet.

At least one embodiment of the system is configured to yield a protein-enriched product stream having a protein content of at least about 70% with respect to a fava protein concentrate feed stream at the feed inlet.

At least one embodiment of the system is configured to yield a protein-enriched product stream having a protein content of at least about 55% with respect to a soy flour feed stream at the feed inlet.

At least one embodiment of the system is configured to yield a protein-enriched product stream having a protein content of at least about 65% with respect to a protein-bone feed stream at the feed inlet.

At least one embodiment of the system is configured to yield a protein-enriched product stream having a protein content of at least about 50% with respect to a fish meal feed stream at the feed inlet.

At least one embodiment of the system is configured to yields a first product stream at the first product stream outlet according to any one of Tables 1-12 presented herein.

At least one embodiment of the system is configured to yield a second product stream at the second product stream outlet according to any one of Tables 1-12 presented herein.

At least one embodiment of the system provides that the tribo-electric belt separator is adjustable to facilitate the production of different grade product streams.

Aspects of the disclosure include a starch-enriched composition as described herein.

Embodiments of the starch-enriched composition include that the starch-enriched composition is deplete in fiber and/or protein.

Embodiments of the starch-enriched composition include that the starch-enriched composition is characterized by a starch content of at least about 1%, 5%, 10%, 20%, 30%, 40%, 50%, 60%, 70%, 80%, 90%, 95%, or 99%.

Embodiments of the starch-enriched composition include that the starch-enriched composition is associated with a D10-D90 particle size range of about 0.1 micron to about 2000 micron, i.e. a D10-D90 particle size range of about 0.1 micron to about 1000 micron, i.e. a D10-D90 particle size range of about 0.5 micron to about 500 micron, i.e. a D10-D90 particle size range of about 1 micron to about 300 micron, i.e. a D10-D90 particle size range of about 10 micron to about 90 micron, i.e. a D10-D90 particle size range of about 1 micron to about 10 micron.

Aspects of the disclosure include a protein-enriched composition as described herein.

Embodiments of the protein-enriched composition include that the protein-enriched composition is deplete in starch, sugar, and/or fiber.

Embodiments of the protein-enriched composition include that the protein-enriched composition is characterized by a starch content of at least about 1%, 5%, 10%, 20%, 30%, 40%, 50%, 60%, 70%, 80%, 90%, 95%, or 99%.

Embodiments of the protein-enriched composition include that the protein-enriched composition is associated with a D10-D90 particle size range of about 0.1 micron to about 2000 micron, i.e. a D10-D90 particle size range of about 0.1 micron to about 1000 micron, i.e. a D10-D90 particle size range of about 0.5 micron to about 500 micron, i.e. a D10-D90 particle size range of about 1 micron to about 300 micron, i.e. a D10-D90 particle size range of about 10 micron to about 90 micron, i.e. a D10-D90 particle size range of about 1 micron to about 10 micron.

Aspects of the disclosure include a fiber-enriched composition as described herein.

Embodiments of the fiber-enriched composition include that the fiber-enriched composition is depleted in starch, sugar, and/or protein.

Embodiments of the protein-enriched composition include that the fiber-enriched composition is characterized by a starch content of at least about 1%, 5%, 10%, 20%, 30%, 40%, 50%, 60%, 70%, 80%, 90%, 95%, or 99%.

Embodiments of the protein-enriched composition include that the fiber-enriched composition is associated with a D10-D90 particle size range of about 0.1 micron to about 2000 micron, i.e. a D10-D90 particle size range of about 0.1 micron to about 1000 micron, i.e. a D10-D90 particle size range of about 0.5 micron to about 500 micron, i.e. a D10-D90 particle size range of about 1 micron to about 300 micron, i.e. a D10-D90 particle size range of about 10 micron to about 90 micron, i.e. a D10-D90 particle size range of about 1 micron to about 10 micron.

Aspects of the disclosure include a wheat starch enriched in starch to have a starch concentration of greater than about 85% and a protein concentration of less than about 5%.

Embodiments of the enriched wheat starch include that the enriched wheat starch has an oil content less than 1%.

Embodiments of the enriched wheat starch include that the enriched wheat starch results in a starch recovery of greater than 92%.

Embodiments of the enriched wheat starch include that the enriched wheat starch has a change in starch concentration of greater than or equal to 12%.

Aspects of the disclosure include a wheat gluten enriched in protein to have a protein concentration of greater than about 50% and a starch concentration of less than about 40%.

Embodiments of the enriched wheat gluten include that the enriched wheat gluten has an oil content greater than 4%.

Embodiments of the enriched wheat gluten include that a protein recovery is greater than 74%.

Embodiments of the enriched wheat gluten include that the enriched wheat gluten has a change in protein concentration of greater than 36%.

Aspects of the disclosure include a sunflower seed meal enriched in protein to have a protein concentration of greater than about 45% and a total fiber concentration of less than about 30%.

Embodiments of the sunflower seed meal include that a protein recovery is greater than 68%.

Embodiments of the sunflower seed meal include that the enriched sunflower seed meal has a change in protein concentration of greater than 8%.

Aspects of the disclosure include a sunflower seed meal enriched in fiber to have a total fiber concentration of greater than about 50% and a protein concentration of less than about 25%.

Embodiments of the enriched sunflower seed meal include that the enriched sunflower seed meal results in a Fiber recovery of greater than 61%.

Embodiments of the enriched sunflower seed meal include that the enriched sunflower seed meal has a change in Fiber concentration of greater than or equal to 15%.

Aspects of the disclosure include a rapeseed meal enriched in protein to have a protein concentration of greater than about 40%.

Embodiments of the enriched rapeseed meal include that a protein recovery is greater than 54%.

Embodiments of the enriched rapeseed meal include that the enriched rapeseed meal has a change in protein concentration of greater than 8%.

Aspects of the disclosure include whole wheat flour enriched in fiber to have a total fiber concentration of greater than about 12% and a total starch concentration of less than about 60%

Embodiments of the enriched whole wheat flour include that the enriched wheat flour is enriched in starch to have a starch concentration of greater than 59% and a protein concentration of less than 16%.

Embodiments of the enriched whole wheat flour include that the enriched wheat flour results in a starch recovery of greater than 66%.

Embodiments of the enriched whole wheat flour include that the enriched wheat flour has a change in starch concentration of greater than or equal to 5%.

Aspects of the disclosure include oat bran enriched in fiber to have a total fiber concentration of greater than about 20% and a starch concentration of less than about 55%. Embodiments of the enriched oat bran include that the enriched oat bran has a change in fiber concentration of greater than 3%.

Aspects of the disclosure include oat bran enriched in starch to have a starch concentration of greater than 65% and a fiber concentration of less than 10%.

Embodiments of the enriched oat bran include that the enriched oat bran has a change in starch concentration of greater than or equal to 12%.

Aspects of the disclosure include wheat bran enriched in fiber to have a total fiber concentration of greater than about 45% and a starch concentration of less than about 20%.

Embodiments of the enriched wheat bran include that the enriched wheat bran has a change in fiber concentration of greater than 2%.

Aspects of the disclosure include wheat bran enriched in starch to have a starch concentration of greater than 40% and a fiber concentration of less than 22%.

Embodiments of the enriched wheat bran include that the enriched wheat bran has a change in starch concentration of greater than or equal to 22%.

Aspects of the disclosure include lupin flour enriched in fiber to have a total fiber concentration of greater than about 40% and a starch concentration of less than about 2%.

Aspects of the discourse include lupin flour enriched in fiber to have a fiber concentration of greater than 45% and a protein concentration of less than 30%.

Embodiments of the enriched lupin flower include that the enriched lupin flour has a change in Fiber concentration of greater than or equal to 6%.

Aspects of the disclosure include lupin flour enriched in protein to have a protein concentration of greater than about 45% and a starch concentration of less than about 2%.

Aspects of the disclosure include lupin flour enriched in protein to have a protein concentration of greater than 45% and a fiber concentration of less than 20%.

Embodiments of the enriched lupin flower include that the enriched lupin flour has a change in protein concentration of greater than 13%.

Aspects of the disclosure include pea protein enriched in protein to have a protein concentration of greater than about 60% and a starch concentration of less than about 5%.

Aspects of the disclosure include fava bean protein enriched in protein to have a protein concentration of greater than about 70% and a starch concentration of less than about 5%.

Aspects of the disclosure include soy flour enriched in protein to have a protein concentration of greater than about 55% and a total fiber concentration of less than about 20%.

Embodiments of the enriched soy flour include that the enriched soy flour has a change in protein concentration of greater than 8%.

Aspects of the disclosure include soy flour enriched in Fiber to have a Fiber concentration of greater than 50% and a protein concentration of less than 55%.

Aspects of the disclosure include soy flour enriched in fiber to have a total fiber concentration of greater than about 20% and a protein concentration of less than about 55%.

Embodiments of the enriched soy flour include that the enriched Soy flour has a change in Fiber concentration of greater than or equal to 1.5%.

Aspects of the disclosure include bone meal enriched in protein to have a protein concentration of greater than about 40%.

Aspects of the disclosure include bone meal enriched in protein to have a protein concentration of greater than 60% and an ash concentration of less than 25%.

Embodiments of the enriched bone meal include that the enriched bone meal has a change in protein concentration of greater than 25%.

Aspects of the disclosure include fish meal enriched in protein to have a protein concentration of greater than about 80%.

Aspects of the disclosure include fish meal enriched in protein to have a protein concentration of greater than 80% and an ash concentration of less than 12%.

Embodiments of the enriched fish meal include that the enriched fish meal has a change in protein concentration of greater than 7%.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Certain illustrative features and examples are described below with reference to the accompanying figures in which.

Figure 1:
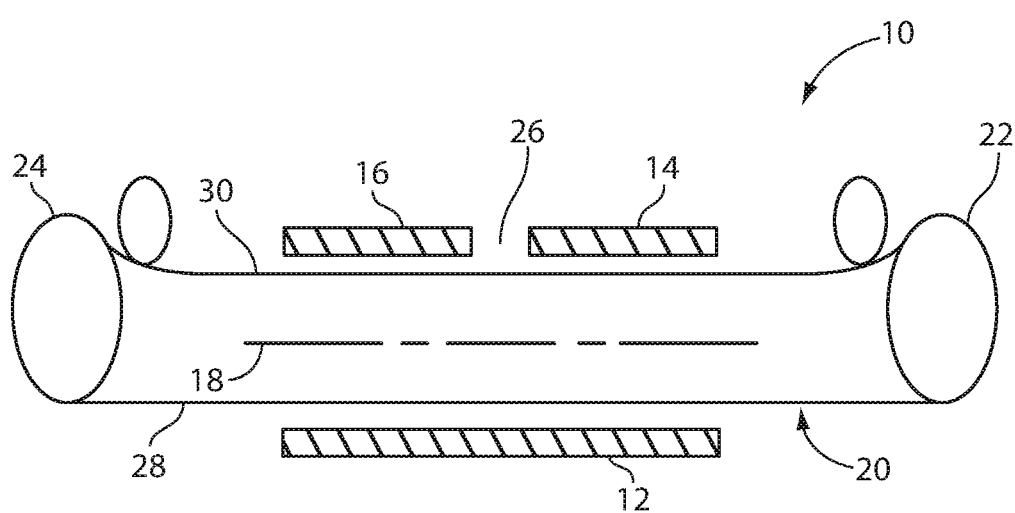
FIG. 1 is a schematic of a tribo-electric belt separator system.

This invention is pointed out with particularity in the appended claims. The advantages of this invention may be better understood by referring to the following description when taken in conjunction with the drawings. The drawings are not intended to be drawn to scale. In the drawings, each identical or nearly identical component that is illustrated in various figures is represented by a like numeral. For purposes of clarity, not every component may be labeled in every drawing. It will be recognized by the person of ordinary skill in the art, given the benefit of this disclosure, that the dimensions, sizes, components, and views shown in the figures are for illustrative purposes. Other dimensions, representations, features, and components may also be included in the embodiments disclosed herein without departing from the scope of the description.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Aspects of the present disclosure are directed to a triboelectric separation process and system for fractionating a feed mixture comprising at least two members of the group of proteins, starches, soluble and insoluble fibers. In particular, embodiments of the process includes supplying the feed mixture comprising at least two of the group of proteins, starches, soluble and insoluble fibers to a tribo-electric separator, and simultaneously charging and separating the feed mixture into at least two subfractions, with one of the subfractions enriched in at least one of protein, starch and fiber and having a composition different than the feed mixture. Embodiments of the process include operating a tribo-electrostatic belt separator (TBS) to fractionate the feed mixture.

The application of conventional electrostatic processes for the separation of food and animal feed materials have been demonstrated only for a narrow range of materials where either a difference in electrical conductivity can be exploited in a conventional roll or drum-type separator, or the feed material particle size is large and uniformly distributed for separation in a low-rate vertical plate-type device. The TBS process can separate a wider range of materials based on tribo-electrostatic charging properties, in a single-step continuous process at a high rate, as demonstrated by the examples shown in this application.

Another factor limiting the usefulness of conventional electrostatic separation processes for the separation of food and animal feed materials is due to the combustible nature of certain food and feed materials. An electrostatic separator must be designed to mitigate the risks associated with processing combustible materials, such as certain food and feed materials. The TBS apparatus of this disclosure has been designed to mitigate these risks in several ways: (1) the TBS apparatus electrodes are designed with discrete tiles which are designed and sized to limit the maximum energy of a spark by the energy that is stored in the capacitor that makes up the electrode tiles, (2) the TBS apparatus belt drive systems are designed to minimize the volume that is exposed to a combustible dust/air mixture, and therefore limit the energy developed during an dust ignition event, and (3) the TBS apparatus is fitted with explosion vents and flame quenching equipment. These features of the TBS apparatus are applied to the designs of the bench-scale (model X2.5) and pilot-scale (model O6/A) devices used in the examples shown in this application.

Figure 2:
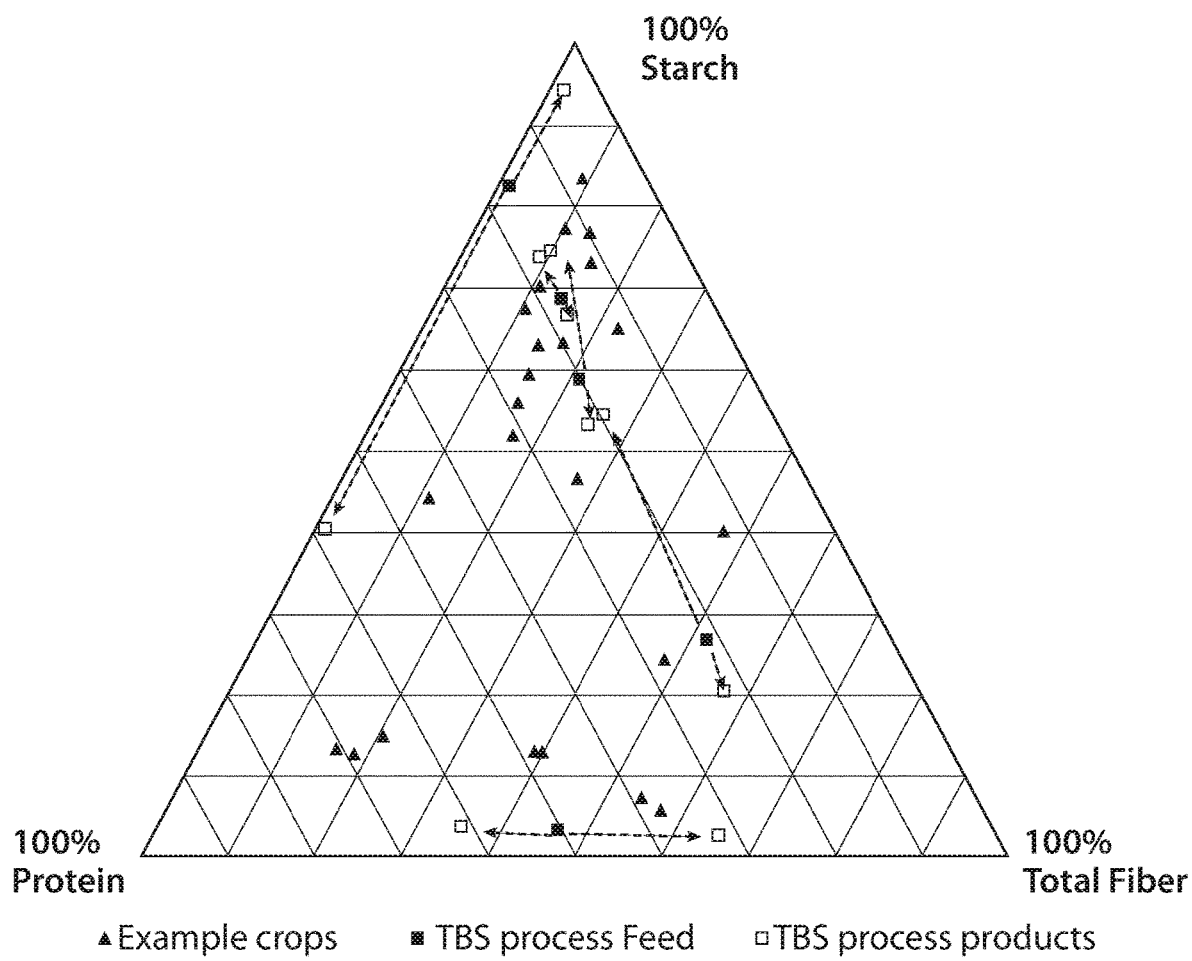
FIG. 2 is a ternary diagram representing composition ranges of various crops and feeds.

FIG. 2 shows a ternary diagram representation of the typical range of compositions (protein, total fiber, starch/sugars/other carbohydrates) for naturally grown materials in the major categories of food and feed ingredients. For purpose of clarity, FIG. 2 does not display the moisture and oil content that was present in the mixtures during processing. The protein content of food and feed materials is measured using the standard Kjeldahl or Dumas methods. The total fiber content is measured using one of the standard analytical methods such as the gravimetric method AOAC 991.43. The total starch and sugars are measured by polarimetry and various other methods or calculated. The oil content is measured using the standard acid hydrolysis/ether extract method. The moisture content is measured using the oven drying method. The composition for each of the three solid phase components is expressed as a percentage excluding the water and oil fractions.

Each of the triangles represents the composition of a particular crop that is used as a food ingredient or animal feed product. The soluble fiber content for these example crops is not included in the fiber measurements. The solid squares represent composition of the feed materials used in exemplary tests of separating such feed materials using the TBS apparatus and process of this disclosure. The empty squares represent the composition of the product and by-product materials produced for each example separation. The dashed arrows indicate the range of composition achieved from each example test separation of a feed material. It is important to note that the feed materials used for the example separations using the TBS apparatus and process contained various amounts of water and oil, and that the feed material input and the resulting outputs are presented as % protein, % fiber, and % starch/sugar/other carbohydrates, normalized to 100% by ignoring the water and oil content for each sample.

Examination of FIG. 2 reveals that the range of exemplary feed materials and outputs that are separated using the TBS apparatus and process of this disclosure form a region that includes most of the various crops (triangles) that are used as food ingredient or animal feed products. Thus, it is reasonable to assume that the TBS separation apparatus and process can be used for the other example crops shown (and not shown in FIG. 2) that both fall within the region that were tested in the examples and it is also reasonable to assume that the crops that are not within the illustrated regions would also be able to be separated by the TBS apparatus and process to yield similar results given the limited number of tests that were run (not all of the crops were subjected to testing). Thus, as is evident from the examples and discussion, it is reasonable to conclude that the TBS process and apparatus of this disclosure can be used on naturally occurring crops (as well as pre-processed crops), other agricultural products, by-products, fish and animal meals, and waste materials having a moisture content and/or an oil content, at commercially significant processing rates to simultaneously charge and separate the crops into two streams each enriched in at least one of protein, fiber and starch.

The present invention relates to a novel process for fractionating granular food and animal feed materials that exist in the regions depicted in FIG. 2 into their constitutive components using the tribo-electric belt separator (TBS) and process. The apparatus of FIG. 1 and the process are effective at processing dry, granular food and feed materials in a single-step separation process, as a continuously operating process, at commercially significant processing rates. By continuous, what is meant is that the constituents to be separated are simultaneously tribo-electrically charged, conveyed and separated. The process is applicable to the separation of various cereal grains, pulses, oilseeds, cocoa, coffee, and other agricultural products, by-products, and waste materials. The process has particular application in the enrichment of protein content of food and feed materials by separating the protein particles from starch and sugar particles, and separating protein particles from fibers. Another application is in the enrichment of starch content in food and feed materials by removal of residual fiber and protein. Other applications include separation of soluble from insoluble fiber, and the consequential enrichment of various health promoting components, such as beta-glucan. In other embodiments of the invention, other constituents of natural materials may be enriched or separated from a mixture containing micronutrients, vitamins, trace elements, color, phytochemicals, or minerals. Other examples of the invention are included showing the enrichment of protein content in animal meals by removal of ash containing bone particles.

The TBS operates as a single-step device where the food and feed particles are simultaneously tribo-charged by the frequent particle to particle collisions that occurs in the single device through the action of the special high-speed continuous-loop belt, conveyed and separated. Electrostatic separation processes based on tribo-charging are superior, and have wider application, than those based on charging by conductive induction or ion bombardment because separation can be achieved for a larger variety of particles with subtle differences in surface chemistry (or surface work function). Because the particle number density is so high within the electrode gap and the flow is vigorously agitated by the high-speed belt, there are many collisions between particles in the device, and optimal tribo-charging occurs continuously throughout the separation zone. The counter-current flow induced by the motion of the continuous-loop belt creates counter-current multi-stage separation within the TBS device.

In contrast to the TBS apparatus and process according to this disclosure, vertical plate electrostatic separators all require a separate upstream processing step to tribo-charge the feed particles prior to separation by the vertical plate separator. For vertical plate separators, the tribo-charging step may require that each particle contacts a special solid surface with particular surface properties to enable differential charge to develop on the surface of particles. However, the need for each feed particle to contact a special solid surface creates a significant limitation on the maximum processing rate that can be achieved with a vertical plate separator for a compact device.

An issue with separating food and feed materials is that they tend to be cohesive powders that adhere especially well to the surface of the electrodes needed to create the electric field in an electro-static separator. An advantage of the motion of the high-speed continuous loop belt in the TBS device and process of this disclosure is that it continuously scrapes the electrodes, which aids in removing the cohesive feed and feed materials from the electrodes and depositing them in the appropriate product hopper. The high-speed continuous loop belt is the only moving part in the TBS device and process, and by its design and high-speed motion it simultaneously conveys and tribo-charges the feed material, and the belt also provides a system to continuously clean electrodes of cohesive feed and feed materials that adhere to the electrodes. This feature enables the TBS apparatus and process of this disclosure to operate continuously without the need for complex electrode scraping mechanisms or electrode polarity switching systems that are required for vertical plate processes.

It is an advantage of the TBS apparatus and process of this disclosure, as illustrated by the test examples disclosed herein and illustrated in FIG. 2 that the TBS apparatus and process can be used to separate feed materials in their naturally occurring state with their naturally occurring moisture and oil content (that no pre-processing is necessary) to achieve separation of the feed content into two enriched streams of at least one of protein, fiber and starch. It is also appreciated that the moisture content of feed material for the TBS apparatus and process can be adjusted to a range that optimizes the particle tribo-charging and therefore optimizes the resultant separation results. The optimal moisture level can depend on the nature of the feed material and will typically vary between 0% and 30%, and preferably between 0.2 and 11%. Adjustment of feed moisture is advantageous for some food and feed materials, but it is not a necessary requirement to adjust the moisture level of food and feed materials to achieve satisfactory separation results for some materials using the TBS device and process of this disclosure. For example, in nine of the twelve examples described below, the separation results were achieved when processing feed materials as-received, that is with moisture levels as occurred naturally in the growing, harvesting, milling, and pre-processing. This observation demonstrates a unique feature and advantage of the TBS apparatus and process of the disclosure, which is that the single step tribo-charging and separating that occurs in the TBS process is adequate to charge the individual components to be separated without the need for a preliminary feed drying, or wetting, or a separate tribo-charging step.

In accordance with one or more embodiments, one or more enriched product streams may be associated with a dry, water-free process, without any required drying. Beneficially, protein concentrates produced by dry processes in accordance with one or more embodiments may retain native protein functionality compared to proteins concentrated by wet processes. In some specific non-limiting embodiments, oilseed meals may be enriched in protein, and fibers may be enriched in b-glucan. In accordance with one or more embodiments, one or more enriched product streams may be produced without chemicals, i.e. without acids, bases, or solvents, and/or without biologics. In accordance with one or more embodiments, one or more enriched product streams may be associated with a single-step, continuous charging and separation process. In accordance with one or more embodiments, one or more enriched product streams may be associated with a high throughput, high capacity process. For example, in some non-limiting embodiments, up to 17,000 kg/hr/m of electrode width is achievable for low density food and feed materials (bulk density 200 kg/m3). In accordance with one or more embodiments, one or more enriched product streams may be associated with a low energy consumption process. For example, less than 4 kWh/tons of feed for low density food and feed materials (bulk density 200 kg/m3). In accordance with one or more embodiments, product streams having different grade ranges with respect to one or more parameters may be provided. In at least some embodiments, the TBS device may be adjusted, i.e. the belt speed may be adjusted to enable the production of different product grades.

It has also been determined that: the TBS device and process can be operated with belt speed between 10 and 70 feet per second, preferably between 45 and 65 feet per second; the voltage applied to the electrodes of the TBS apparatus and process electrodes can vary between 3 kV and 20 kV, preferably between 10 and 16 kV; that the gap between the electrodes is continuously adjustable and can be varied between 0.5 to 2.5 cm, preferably between 0.9 to 1.7 CM.

The function and advantages of these and other embodiments will be more fully understood from the following non-limiting examples. The examples are intended to be illustrative in nature and are not to be considered as limiting the scope of the embodiments discussed herein.

Examples of separation results obtained from various food and feed materials are detailed in the following examples, and the ranges of products and by-products achieved for selected examples is shown graphically in FIG. 2.

Example 1: Separation of Protein and Starch

A mixture comprised of wheat gluten (a type of protein) and wheat starch was prepared for testing using the pilot-scale (model O6/A) TBS apparatus and process to demonstrate the capability of the TBS apparatus and process to simultaneously charge and separate distinct protein and starch particles using the TBS apparatus and process in a single step. The feed material had a median particle size of approx. 90 microns, contained 8.1% moisture, and contained 1.7% oil, as measured by the acid hydrolysis method. The feed sample was fed as-received, with no adjustment to the moisture content, into the separator at a rate of 3600 kg per hour per meter of TBS electrode width. The TBS belt speed was set at 65 feet per second, and 12 kV was applied across the TBS electrode gap to produce an electric field strength of 1125 kV/m. Two resulting products were collected from the two ends of the separator. There was no middling fraction that needed to be re-processed. The mass yields of the two products, the composition of the feed and the products are shown in Table 1 below.

TABLE 1

Results from testing wheat gluten and wheat starch mixture

|  | Feed | Product 1 (Enriched Starch) | Product 2 (Enriched Protein) |
| --- | --- | --- | --- |
| Mass | 100% | 83% | 17% |
| Protein | 14.6% | 3.6% | 51.0% |
| Moisture | 8.1% | — | — |
| Fiber | 1.4% | 1.5% | 1.3% |
| Ash | 0.4% | 0.3% | 0.8% |
| Fat/Oil | 1.7% | 0.7% | 4.7% |
| Starch | 75.6% | 87.6% | 36.2% |
| Starch Recovery |  | 92.1% | 7.9% |
| Protein Recovery |  | 25.6% | 74.4% |

Figure 3:
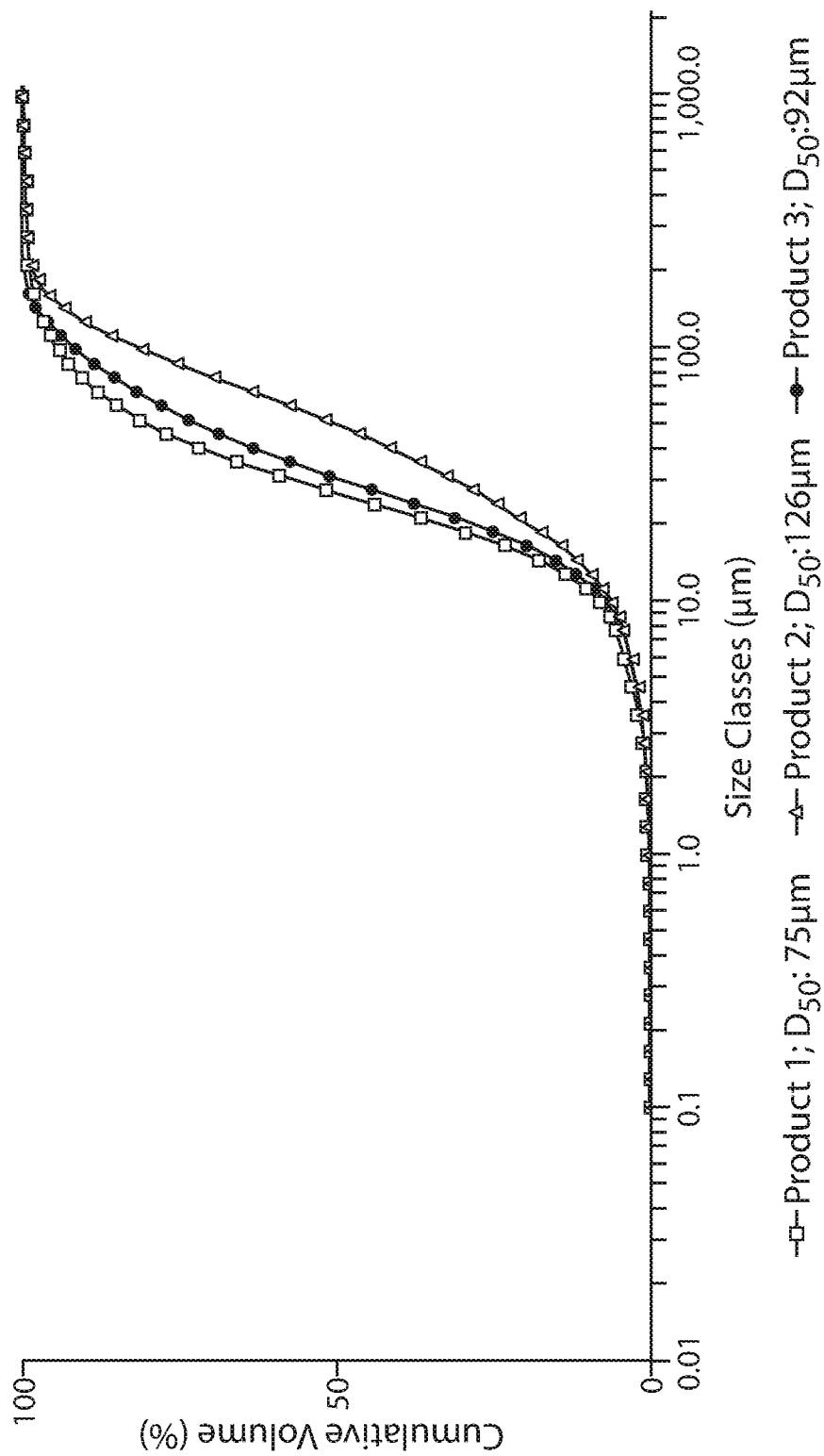
FIG. 3 is a graph of various particle size distributions separated from a wheat gluten/starch mixture as discussed in accompanying Example 1.

The results in Table 1 show that product 1 is enriched in starch content with starch recovery i.e. fraction of feed starch recovered in product 1, of approx. 92%. Product 2 is enriched in protein content with protein recovery i.e. fraction of feed protein recovered in product 2, of approx. 74%. Particle size measurements of feed, product 1 and product 2 samples were conducted using a laser diffraction-based Malvern analyzer: FIG. 3 shows the particle size distribution for the feed, product 1, and product 2 with the median particle size (D50). The breath of the particle size distribution for each sample can be expressed using the value where 10% of the sample consists of particles smaller than a given size (D10), and the value where 90% of the sample consists of particles smaller than a given size (D90). For this feed sample, the D10-D90 range was 12 to 92 microns. For Product 1, the range was 11 to 75 microns. For Product 2, the range was 13 to 126 microns.

This example demonstrates the capability of TBS process to effectively tribo-charge and separate distinct protein and starch particles in a single step from a feed sample in fine dry powder form, at high processing rate, generating product streams enriched in each component.

Example 2: Separation of Protein and Fiber with Low Oil Content

A sample of finely ground solvent extracted sunflower seed meal was tested using the pilot-scale (model O6/A) TBS apparatus and process, with the goal of enriching its protein content by separating fiber content and demonstrating the capability of a TBS apparatus and process to simultaneously charge and separate distinct protein and fiber particles in a single step. The sunflower seed meal sample was milled to approximate median particle size of 75 micron and contained 8% moisture and 0.6% oil as measured by the acid hydrolysis method.

The feed sample was fed as received, with no adjustment to the moisture content, into the separator at a rate of 9,520 kg/hr/m of TBS electrode width. The TBS belt speed was set at 45 feet per second, and 12 kV was applied across the TBS electrode gap to produce an electric field strength of 1050 kV/m. Two resulting products were collected from the two ends of the separator. There was no middling fraction that needed to be re-processed. The mass yields of the two products, composition of the feed and the products from one of the test runs are shown in table 2 below.

TABLE 2

Results from testing sunflower seed meal

|  | Feed | Product 1 (Fiber Enriched) | Product 2 (Protein Enriched) |
| --- | --- | --- | --- |
| Mass | 100% | 46% | 54% |
| Protein | 37.7% | 24.7% | 46.5% |
| Moisture | 8.0% | — | — |
| Total Fiber | 35.7% | 50.8 | 26.9 |
| Fat/Oil | 0.6% | — | — |
| Starch | 2.3% | 2.0% | 2.7% |
| Protein Recovery |  | 31.1% | 68.9% |
| Fiber Recovery |  | 61.7% | 38.3% |

Figure 4:
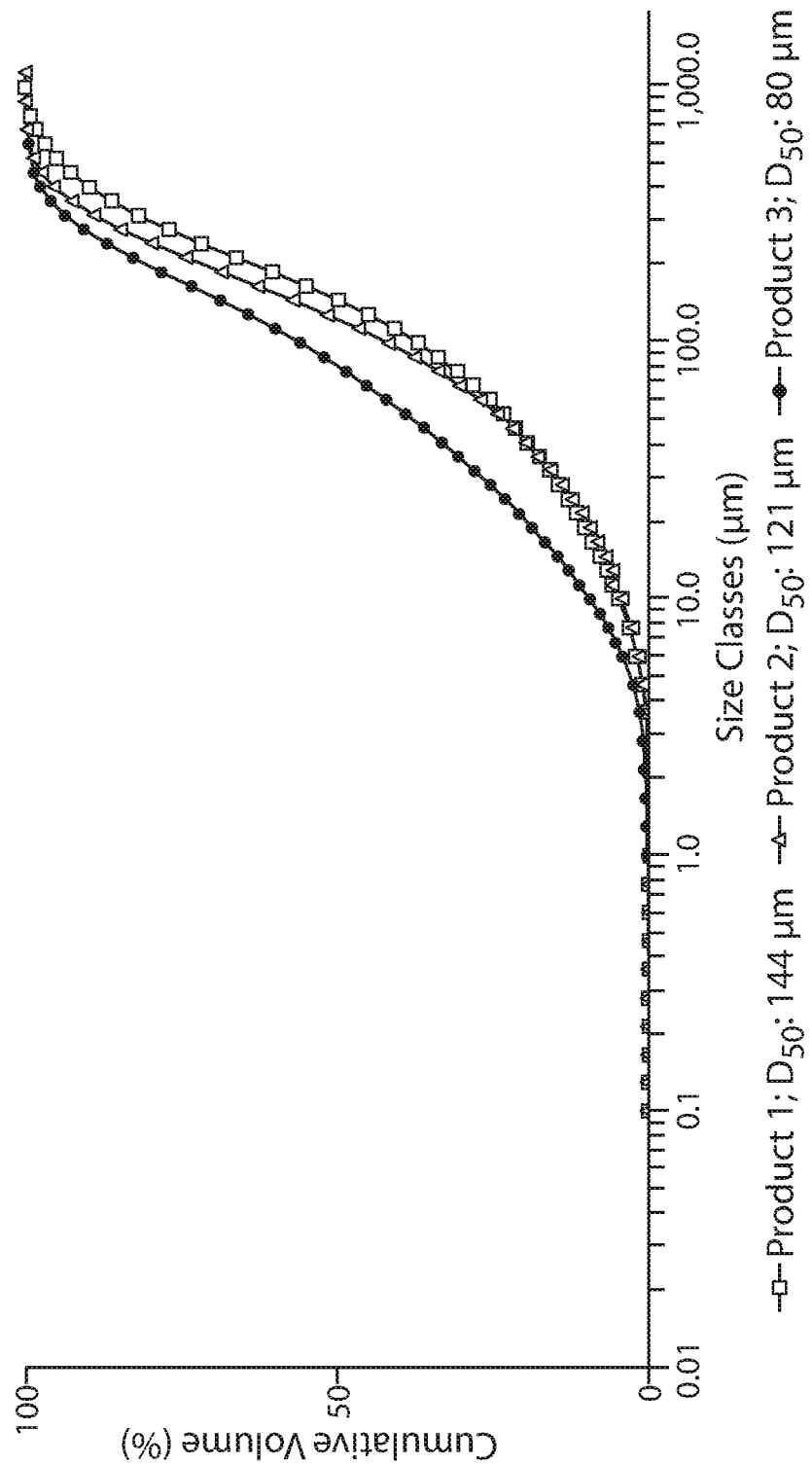
FIG. 4 is a graph of various particle size distributions separated from sunflower seed meal as discussed in accompanying Example 2.

The results in Table 2 show that product 2 is enriched in protein content with a protein recovery i.e. fraction of feed protein recovered in product 2, of approximately 69%. The fiber recovery to product 1 is approximately 62%. Particle size measurements of the feed, product 1 and product 2 samples were conducted using laser diffraction-based Malvern analyzer. FIG. 4 shows the particle size distribution of the feed, product 1, and product 2 with their median size (D50). For this feed sample, the particle size ranged (D10 to D90) from 10 to 266 micron. For product 1 the range was 18 to 403 microns. For product 2, the range was 20 to 320 microns.

Figure 5:
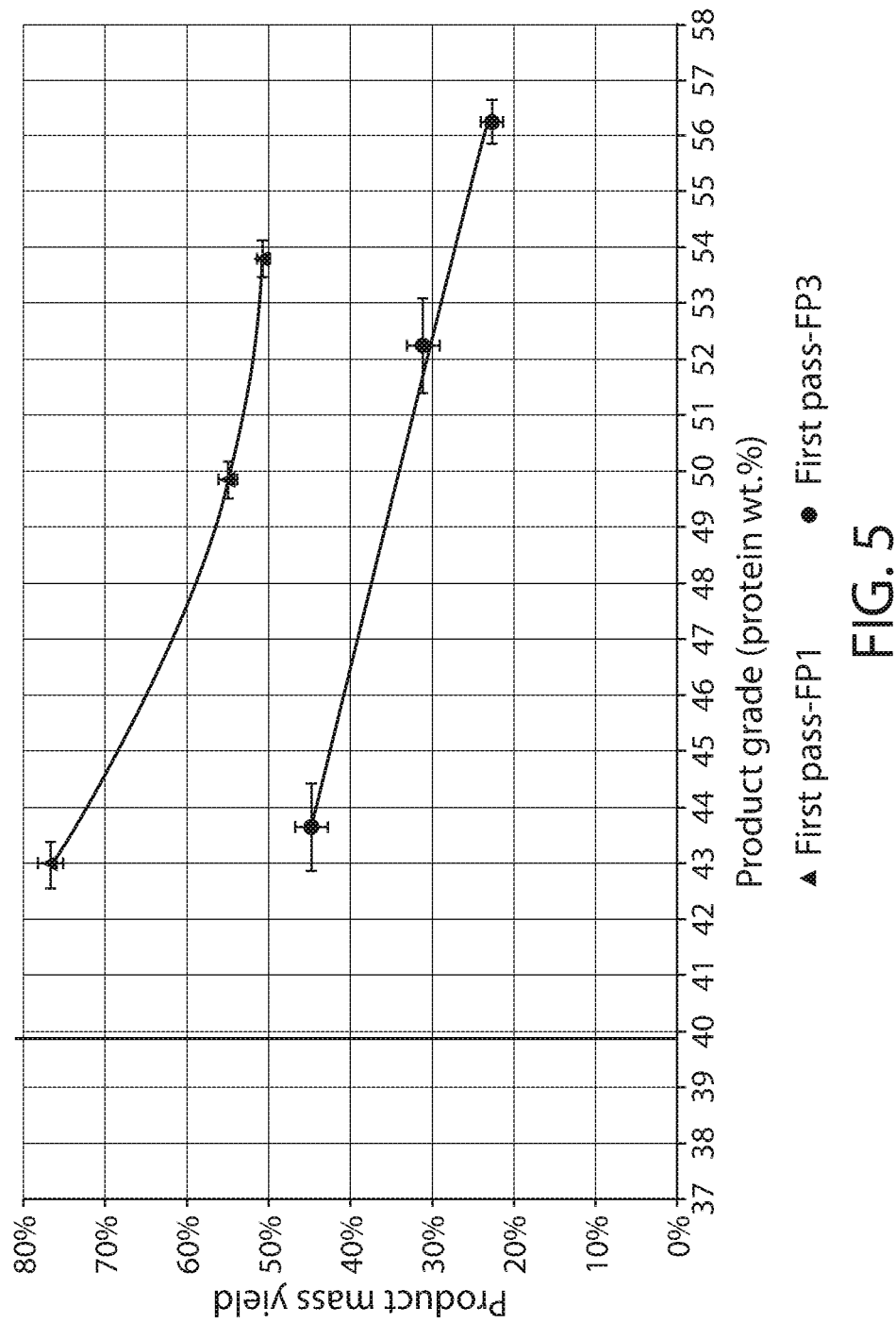
FIG. 5 is a graph comparing two feed ports after a single pass in sunflower seed meal as discussed in Example 2.

Several tests were conducted to optimize process variables such as belt speed and feed port, and a product mass yield v/s product grade curve was generated by averaging the results. FIG. 5 shows the results from a single pass when the feed was fed using two different feed ports in the TBS. This result shows that the TBS apparatus and process can separate and producing a wide range of products with different levels of purity at corresponding product mass yield.

This example demonstrates the capability of the TBS apparatus and process fed at any feed port to effectively charge and separate protein and fiber particles in a single step from a feed sample in fine dry powder form, at high processing rate, generating a product stream enriched in protein, and a product stream enriched in fiber.

Example 3: Separation of Protein and Fiber with High Oil Content

A sample of milled, mechanically-extracted rapeseed meal was tested using the bench-scale (model X2.5) TBS apparatus and process, with the goal of enriching its protein content by separating fiber content and demonstrating the capability of TBS apparatus and process to simultaneously charge and separate distinct protein and fiber particles in a single step. The rapeseed meal sample was milled to approximate median particle size of 132 micron and contained 7.6% moisture and 9.8% oil as measured by the acid hydrolysis method.

The feed sample was fed as received, with no adjustment to the moisture content, into the separator. Two resulting products were collected from the two ends of the separator. There was no middling fraction that needed to be re-processed. The mass yields of the two products, composition of the feed and the products from one of the test runs are shown in Table 3 below.

TABLE 3

Results from testing mechanically extracted rapeseed meal

|  | Feed | Product 1 (Fiber Enriched) | Product 2 (Protein Enriched) |
|---|---|---|---|
| Mass | 100% | 62.9% | 37.1% |
| Protein | 35.0% | 31.0% | 43.3% |
| Moisture | 7.6% | — | — |
| Fat/Oil | 9.8% | — | — |
| Fiber | 33.9% | 39.8% | 21.3% |
| Protein Recovery |  | 45.2% | 54.8% |
| Fiber Recovery |  | 76% | 34% |

The results in Table 3 show that product 2 is enriched in protein content with a protein recovery i.e. fraction of feed protein recovered in product 2, of approximately 55%. This result shows that the TBS apparatus and process is capable of enriching protein from rapeseed meal that has been mechanically extracted (expeller pressed) with a relatively high oil content.

Example 4: Separation of Fiber and Starch

A sample of whole wheat flour was tested using a pilot-scale (model O6/A) TBS apparatus to demonstrate the capability of the TBS apparatus and process to simultaneously charge and separate distinct fiber and starch particles in a single step. The sample of whole wheat feed material had a median particle size of approx. 160 microns, contained 11.5% moisture, and contained 1.6% oil as measured by the acid hydrolysis method.

The feed sample was fed as-received, with no adjustment to feed moisture level, into the TBS separator at a rate of 7750 kg/hr/m of TBS electrode width. The TBS belt speed was set at 65 feet per second, and 16 kV was applied across the TBS electrode gap to produce an electric field strength of 1170 kV/m. Two resulting products were collected from the two ends of the separator. There was no middling fraction that needed to be re-processed. The mass yields of the two products, composition of the feed and the products from one of the test runs are shown in Table 4 below.

TABLE 4

Results from testing whole wheat flour

|  | Feed | Product 1 (Fiber Enriched) | Product 2 (Starch Enriched) |
|---|---|---|---|
| Mass | 100% | 40.3% | 59.7% |
| Protein | 15.3% | 15.0% | 15.3% |
| Moisture | 11.5% | — | — |
| Fat/Oil | 1.6% | — | — |
| Total fiber | 12.8% | 13.9% | 8.5% |
| Ash | 1.3% | 1.7% | 1.2% |
| Total starch | 61.6% | 57.6% | 66.1% |

Figure 6:
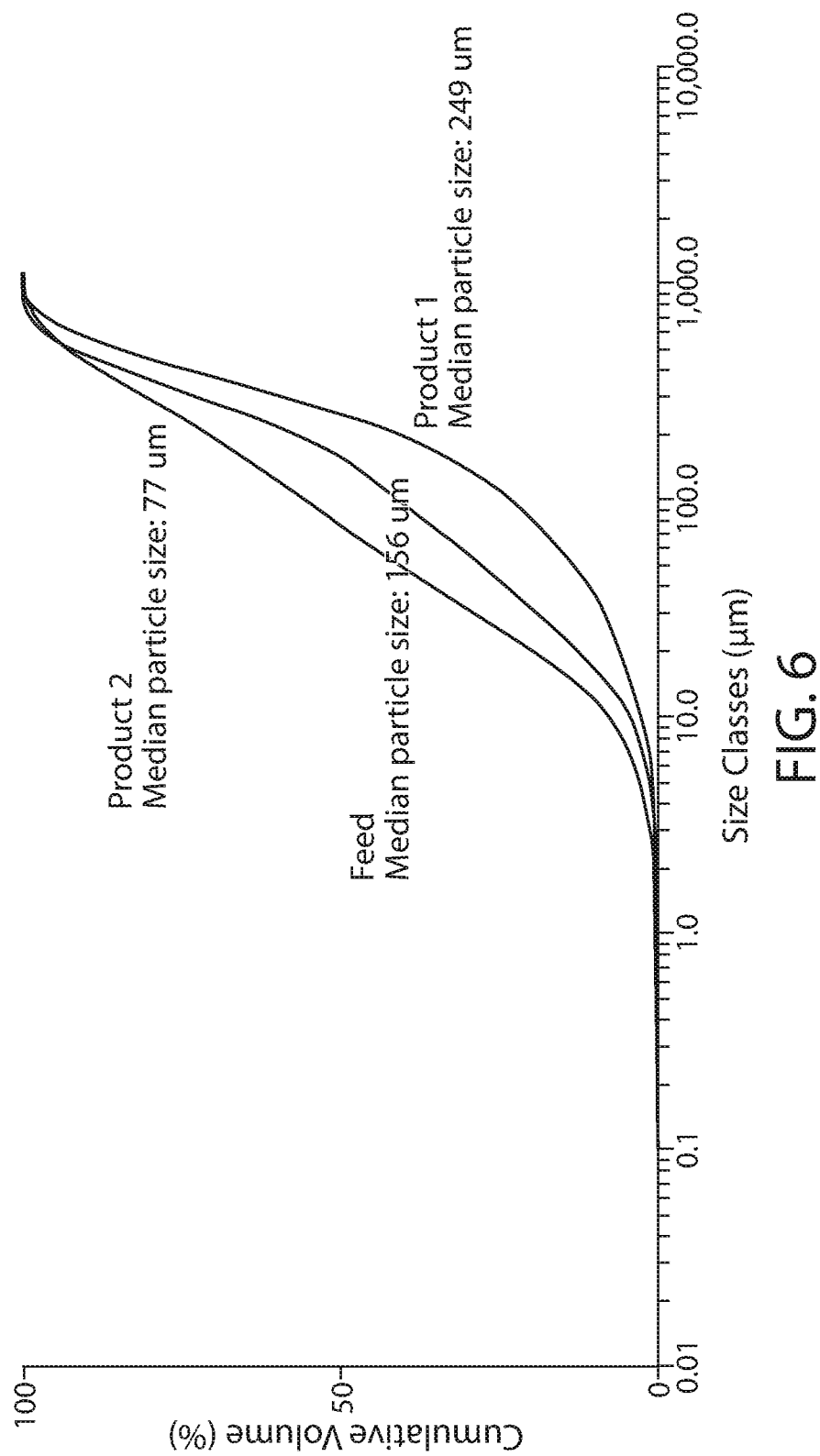
FIG. 6 is a graph of various particle size distributions separated from whole wheat flour as discussed in Example 4.

The results in Table 4 show that product 1 is enriched in fiber and product 2 is enriched in starch content. Particle size measurements of the feed, product 1 and product 2 samples were conducted using laser diffraction-based Malvern analyzer. FIG. 6 shows the particle size distribution of the feed, product 1, and product 2 with their median size (D50). For this feed sample, the particle size ranged (D10 to D90) from 17 to 469 micron. For product 1 the range was 37 to 563 microns. For product 2, the range was 12 to 432 microns.

Figure 7:
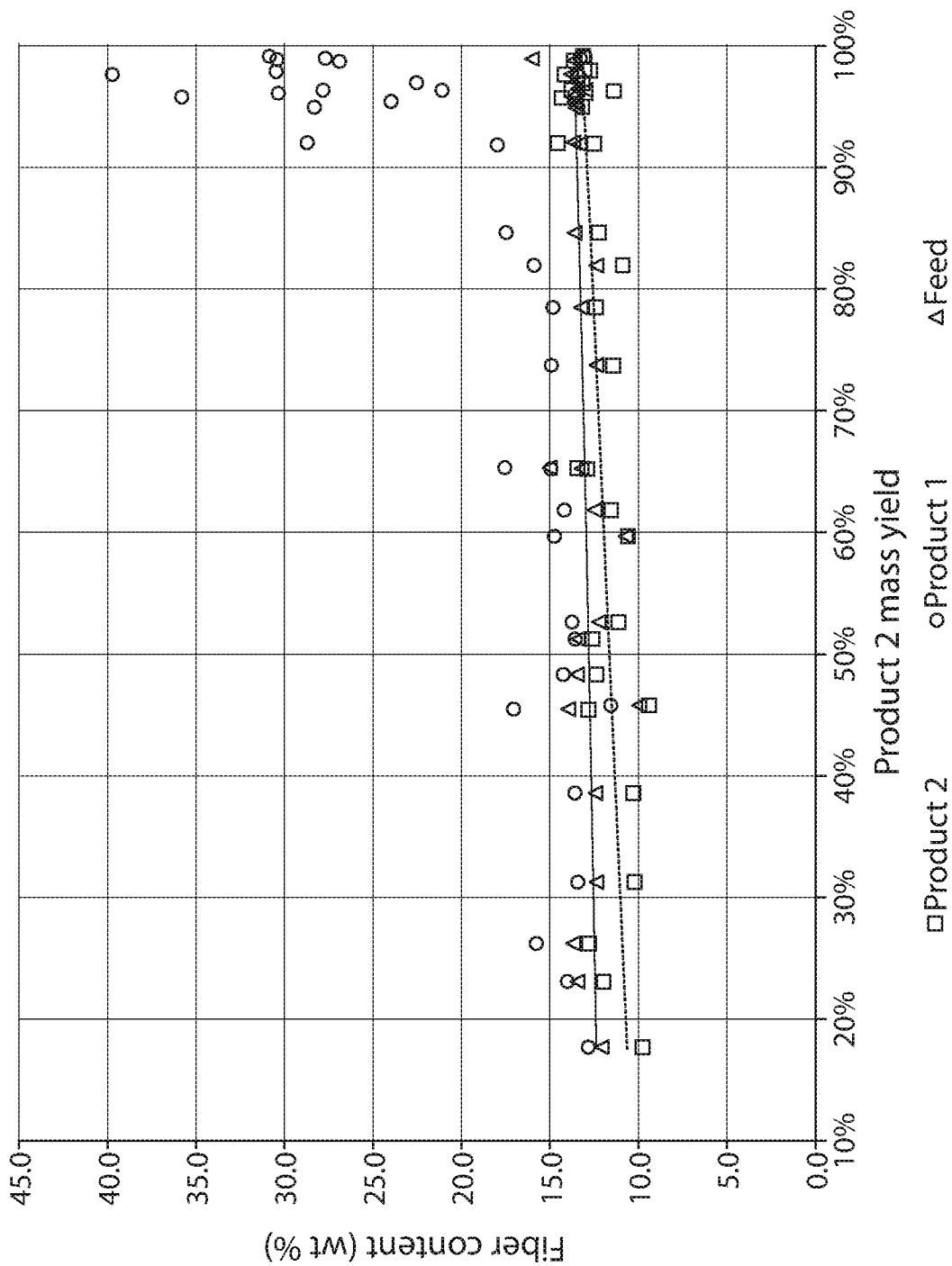
FIG. 7 is a graph comparing the starch content to fiber content in whole wheat flour as discussed in Example 4.

Several tests were conducted to optimize separator variables such as electrode polarity configuration and feed port, and ash content was used to estimate the fiber content of the feed and products. FIG. 7 shows low ash product (product 2) mass yield v/s estimated fiber content of feed, fiber enriched product (product 1) and starch enriched product (product 2) data collected at various separator run conditions from a single pass. It shows that the TBS apparatus and process can produce a product with wide range of fiber content.

Example 5: Separation of Fiber and Starch

A sample of oat bran was tested using a pilot-scale (model O6/A) TBS apparatus to demonstrate the capability of the TBS apparatus and process to simultaneously charge and separate distinct soluble fiber, insoluble fiber, and starch particles in a single step. The feed material had a median particle size of approx. 800 microns. Preliminary experiments were conducted to determine the feed moisture level that results in optimum separation results for this feed material. The feed moisture content was adjusted to a level of 0.2% moisture, and the sample was fed in the separator at a rate of 5356 kg per hour per meter of TBS electrode width. The TBS belt speed was set at 65 feet per second, and 12 kV was applied across the TBS electrode gap to produce an electric field strength of 995 kV/m. Two resulting products were collected from the two ends of the separator. There was no middling fraction that needed to be re-processed. The mass yields of the two products, composition of the feed and the products are shown in Table 5.

TABLE 5

Results from testing oat bran

|  | Feed | Product 1 (Fiber-enriched) | Product 2 (Starch-enriched) |
|---|---|---|---|
| Mass | 100% | 89.2% | 10.8% |
| Protein | 18.0% | 19.3% | 13.9% |
| Moisture | 0.2% | — | — |
| Ash | 2.9% | 3.3% | 1.7% |
| Total fiber | 17.3% | 20.7% | 8.2% |
| Insoluble fiber | 9.2% | 10.1% | 4.4% |
| Soluble fiber | 8.1% | 10.6% | 3.8% |
| Fat/Oil | 8.4% | — | — |
| Starch | 53.4% | 46.6% | 65.7% |

Figure 8:
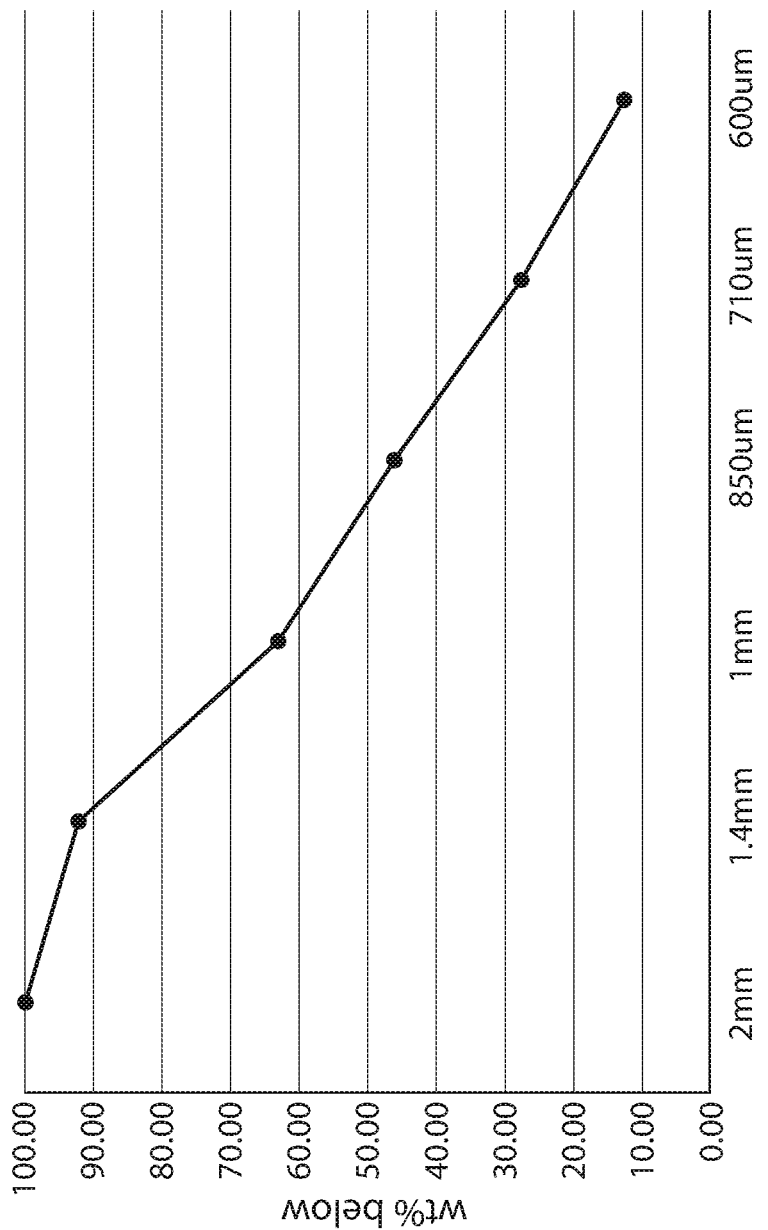
FIG. 8 is a graph of the particle size distribution of the feed in oat bran as discussed in Example 5.

The results in Table 5 show that product 1 is enriched in fiber and product 2 is enriched in starch. Particle size measurements of the feed were conducted using ultrasonic air sieving. FIG. 8 shows the particle size distribution of the feed, with the median size ($D_{50}$). For this feed sample, the particle size ranged ($D_{10}$ to $D_{90}$) from 600 to 1400 micron.

This example demonstrates the capability of TBS process to effectively charge and separate distinct fiber and starch particles in a single step from a feed sample in fine dry powder form, at high processing rate, generating product streams enriched in each component.

Total dietary fiber is commonly divided into two types. Insoluble fiber is primarily composed of cellulose, hemicellulose, and lignins. Soluble fibers such as for example beta glucans or fructooligosaccharides are polysaccharides with a lower molecular weight than cellulose. Cellulose as a main representative of insoluble fiber occurs in nature as highly dense and highly crystalline protective material whereby soluble fibers occur in less crystalline form and have a lower molecular weight, similar to starches. The TBS apparatus and process is shown to be effective in separation of fiber and starch with cellulose being the main component of fiber. Therefore, it is reasonable to expect that the TBS apparatus and process is also effective in separation soluble and insoluble fiber, in the absence of starch.

Example 6: Separation of Fiber and Starch

A sample of wheat bran was tested using the pilot-scale (model O6/A) TBS apparatus to demonstrate the capability of the TBS apparatus and process to simultaneously charge and separate distinct soluble fiber, insoluble fiber, and starch particles in a single step. The feed material had a median particle size of approx. 800 microns. Preliminary experiments were conducted to determine the feed moisture level that results in optimum separation results for this feed material. The feed moisture content was adjusted to a level of 2.1% moisture, and the sample was fed in the separator at a rate of 2976 kg per hour per meter of TBS electrode width. The TBS belt speed was set at 65 feet per second, and 12 kV was applied across the TBS electrode gap to produce an electric field strength of 1050 kV/m. Two resulting products were collected from the two ends of the separator. There was no middling fraction needed to be re-processed. The mass yields of the two products, composition of the feed and the products are shown in Table 6.

TABLE 6

Results from testing wheat bran

| Run ID RD5 1 70620 A11 | Feed | Product 1 (Fiber-enriched) | Product 2 (Starch-enriched) |
|---|---|---|---|
| Mass | 100% | 91% | 9% |
| Protein | 17.9% | 18.3% | 15.8% |
| Moisture | 2.1% | — | — |
| Ash | 5.8% | 6.6% | 4.3% |
| Total fiber | 43.5% | 45.1% | 22.3% |
| Soluble fiber | 3.9% | 4.2% | 2.5% |
| Fat/Oil | 2.3% | — | — |
| Starch | 22.7% | 16.5% | 44.8% |

Figure 9:
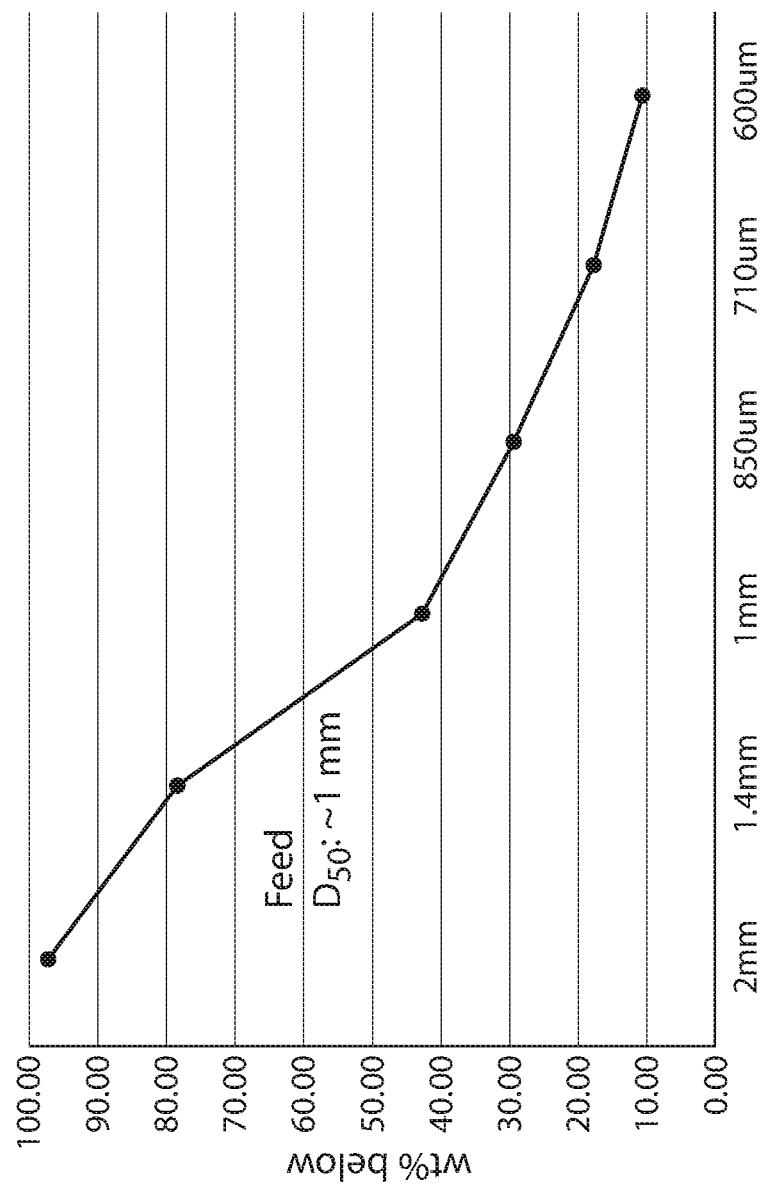
FIG. 9 is a graph of the particle size distribution of the feed in wheat bran as discussed in Example 6.

Particle size measurements of the feed, product 1 and product 2 were conducted using ultrasonic air sieving. FIG. 9 shows the particle size distribution of the feed, with the median size ($D_{50}$). For this feed sample, the particle size ranged ($D_{10}$ to $D_{90}$) from 600 to 1700 micron.

This example demonstrates the capability of TBS process to effectively charge and separate fiber and starch particles in a single step from a feed sample in fine dry powder form, at high processing rate, generating product streams enriched in fiber and starch.

Example 7: Enrichment of Protein from Lupin

Figure 10:
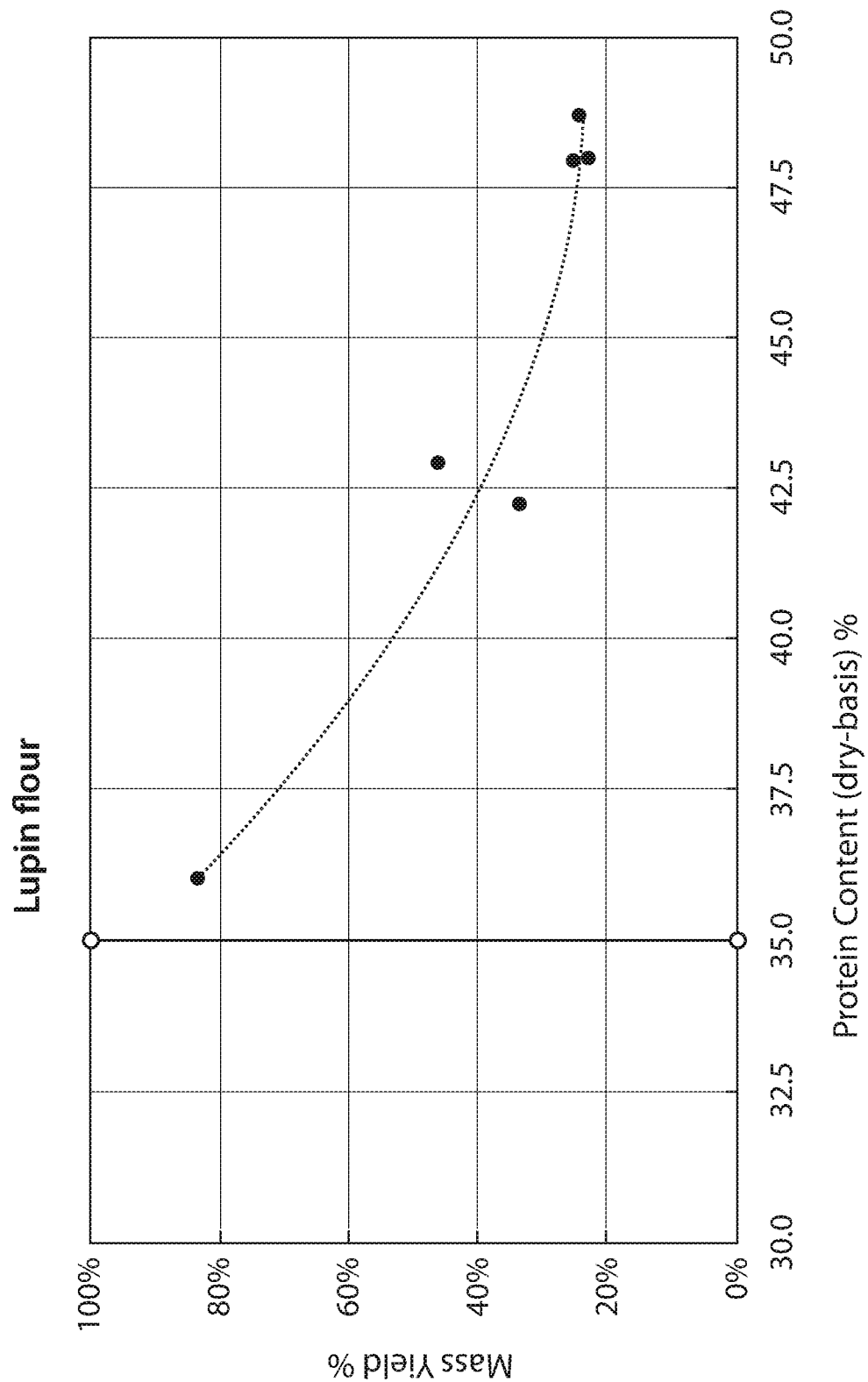
FIG. 10 is a graph of the protein content separated in a feed of lupin flour as discussed in Example 7.

A sample of milled lupin flour, a type of legume, was tested using the bench-scale (model X2.5) TBS apparatus and process, with the goal of enriching its protein content and demonstrating the capability of TBS apparatus and process to simultaneously charge and concentrate protein particles in a single step. The sample was milled to a median particle size of 80 micron, and tested as received, with no adjustment to the moisture content. A total of 12 runs were completed. The mass yield and the protein content of the product from one of the test runs is shown below in Table 7 and FIG. 10. This result shows that the TBS apparatus and process is capable of separating protein from flour and producing different levels of purity at a corresponding product mass yield.

TABLE 7

Results from testing lupin flour

| Run ID 171221-6 | Feed | Product 1 (Fiber Enriched) | Product 2 (Protein Enriched) |
|---|---|---|---|
| Mass | 100% | 75.5% | 24.5% |
| Protein | 35.0% | 30.2% | 48.0% |
| Moisture | 7.3% | — | — |
| Total Fiber | 36.1% | 42.7% | 18.8% |
| Fat/Oil | 9.7% | 8.7% | 11.8% |
| Starch | 1.1% | <1% | 1.0% |

Example 8: Enrichment of Protein from Pea

A sample of pea protein concentrate was tested using the bench-scale (model X2.5) TBS apparatus and process, with the goal of enriching its protein content and demonstrating the capability of TBS apparatus and process to simultaneously charge and concentrate protein particles in a single step. The sample was dry processed using conventional methods. The median particle size was 7 micron and fed as-received to the TBS apparatus. The mass yield and the protein content of the product from one of the test runs is shown below in Table 8. This result shows that the TBS apparatus and process is capable of further enriching the protein content of pea protein that had been pre-processed using conventional dry separation techniques based on size and density-based separation methods.

TABLE 8

Results from testing pea protein concentrate

| Run ID 180710-4 | Feed | Product 1 (Starch Enriched) | Product 2 (Protein Enriched) |
|---|---|---|---|
| Mass | 100% | 39.7% | 60.3% |
| Protein | 57.6% | 52.1% | 61.6% |
| Moisture | 7.3% | — | — |
| Total Fiber | 17.3% | 23.9% | 13.4% |
| Fat/Oil | 2.4% | | |
| Starch | 4.0% | 4.7% | 3.5% |

Example 9: Enrichment of Protein from Fava Bean

A sample of fava bean protein concentrate was tested using the bench-scale (model X2.5) TBS apparatus and process, with the goal of enriching its protein content and demonstrating the capability of TBS apparatus and process to simultaneously charge and concentrate protein particles in a single step. The sample was dry processed using conventional methods. The median particle size was 8 micron and the material was fed as-received to the TBS apparatus. The mass yield and the protein content of the product from one of the test runs is shown below in Table 9. This result shows that the TBS apparatus and process is capable of further enriching the protein content of fava protein that had been pre-processed using conventional dry separation techniques based on differences in particle size and density.

TABLE 9

Results from testing fava protein concentrate

| Run ID 180710-4 | Feed | Product 1 (Starch Enriched) | Product 2 (Protein Enriched) |
|---|---|---|---|
| Mass | 100% | 38.6% | 61.4% |
| Protein | 66.6% | 60.0% | 71.5% |
| Moisture | 8.3% | — | — |
| Total Fiber | 13.3% | 18.5% | 11.8% |
| Fat/Oil | 2.0% | | |
| Starch | 6.0% | 8.6% | 4.6% |

Example 10: Enrichment of Protein from Soy Flour

A sample of defatted soy flour was tested using the pilot-scale (model O6/A) TBS apparatus and process, with the goal of enriching its protein content and demonstrating the capability of TBS apparatus and process to simultaneously charge and concentrate protein particles in a single step. The sample was processed using conventional methods. The median particle size was 20 micron and the material was fed as-received to the TBS apparatus. The mass yield and the protein content of the product from one of the test runs is shown below in Table 10. This result shows that the TBS apparatus and process can enrich the protein content of soy flour that had been pre-processed using conventional techniques.

TABLE 10

Results from testing defatted soy flour

| Run IDRD9 170822 A6 | Feed | Product 1 (Fiber Enriched) | Product 2 (Protein Enriched) |
|---|---|---|---|
| Mass | 100% | 54.2% | 45.8% |
| Protein | 55.5% | 51.8% | 59.5% |
| Moisture | 4.2% | — | — |
| Total Fiber | 18.8% | 20.5% | 17.5% |
| Fat/Oil | <0.3% | | |

Example 11: Enrichment of Protein from Bone Meal

Figure 11:
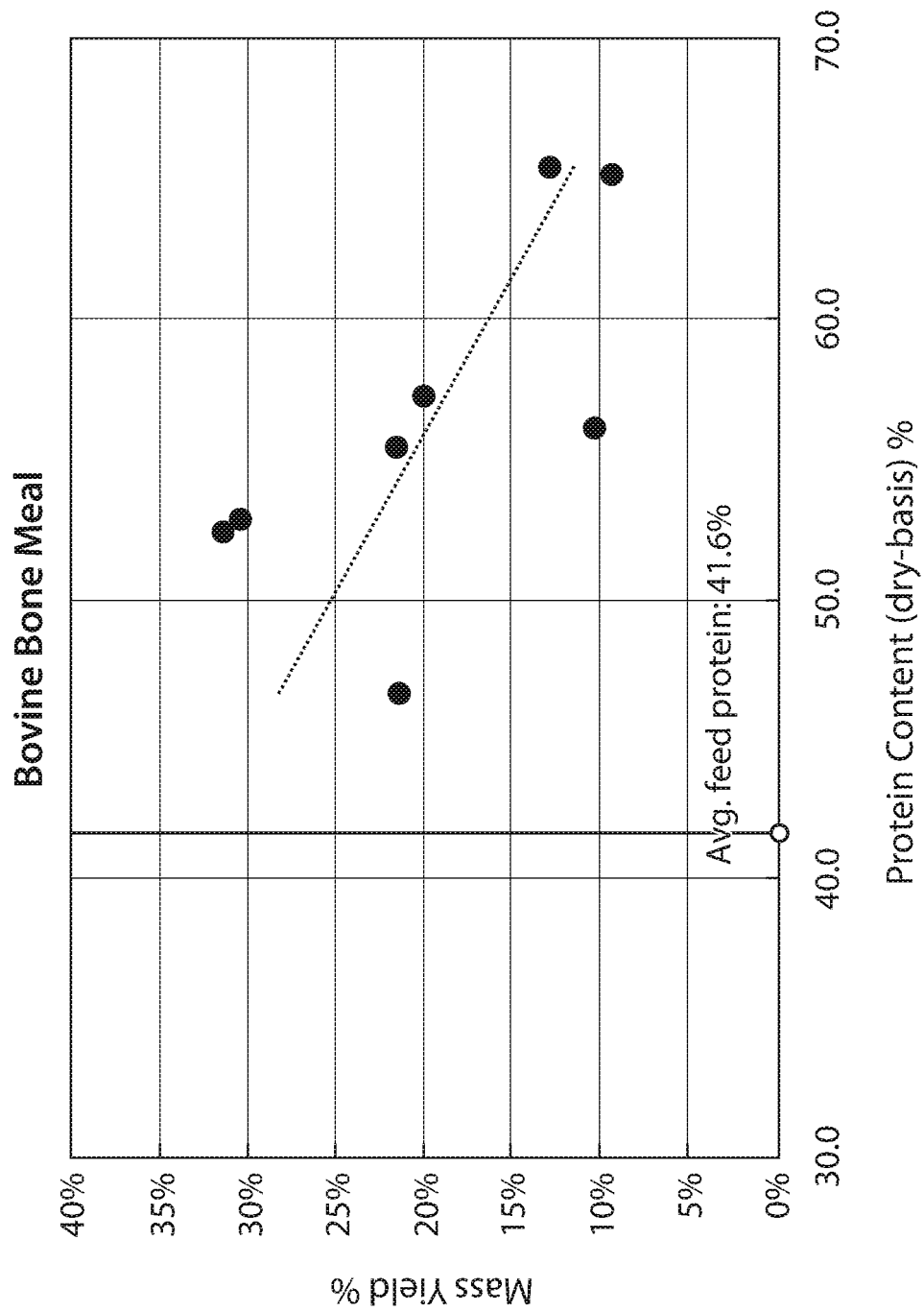
FIG. 11 is a graph of the protein content separated in a feed of bone meal as discussed in Example 11.

A screened sample of gel bone lights, generated from bovine bone meal, was tested using the bench-scale (model X2.5) TBS apparatus and process, with the goal of enriching its protein content and demonstrating the capability of TBS apparatus and process to simultaneously charge and separate distinct protein particles from bone particles in a single step. The sample had a median particle size of 850 micron and was oven dried prior to testing. In contrast to previous examples, the separation is between protein and bone, instead of protein and fiber or starch. The mass yields and the protein content of the product from one of the test runs is shown below in Table 11. This result shows that the TBS apparatus and process is capable of separating protein from bone meal and producing different levels of purity at a corresponding product mass yield. FIG. 11 shows results from eight runs of the TBS with a top negative polarity.

TABLE 11

Results from Testing Bovine Bone Meal -Gel bone lights
Analytical results

| Run ID 171218-3 | Feed | Product 1 (Protein Enriched) | Product 2 (Ash Enriched) |
|---|---|---|---|
| Mass | 100% | 9.2% | 90.8% |
| Protein | 41.0% | 65.6% | 38.7% |
| Moisture | 5.6% | | |
| Ash | 50.5% | 25.1% | 54.4% |
| Oil/Fat | 5.4% | 8.5% | 4.1% |

Example 12: Enrichment of Protein from Fish Meal

A milled sample of fish meal was tested using the bench-scale (model X2.5) TBS apparatus and process, with the goal of enriching its protein content and demonstrating the capability of TBS apparatus and process to simultaneously charge and separate distinct protein particles from bone particles in a single step. The sample was milled to a median particle size of 81 micron and subsequently dried prior to testing. The mass yields and the protein content of the product from one of the test runs is shown below in Table 12. This result shows that the TBS apparatus and process is capable of separating protein from bone in fish meal.

TABLE 12

Results from Testing Fish Meal
Analytical results

| Run ID 180618-1 | Feed | Product 1 (Protein Enriched) | Product 2 (Ash Enriched) |
|---|---|---|---|
| Mass | 100% | 81.3% | 18.7% |
| Protein | 73.4% | 80.4% | 54.7% |
| Moisture | 0.3% | | |
| Ash | 17.6%% | 12.6% | 39.0% |

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

The invention claimed is:

1. A process for fractionating a feed mixture having a moisture content from 6% to 8% and comprising protein and at least one of starches, soluble fibers and insoluble fibers using a single step, continuous tribo-electrostatic separation process, comprising:
   a. supplying said feed mixture to a tribo-electrostatic belt separator, said feed mixture comprising pulses, legumes, oilseeds, oilseed meal, fish meal, bone meal, or meat and bone meal (MBM);
   b. simultaneously charging and separating said feed mixture into at least two subfractions, wherein when said feed mixture comprises pulses, legumes, oilseeds or oilseed meal, one of the subfractions is enriched in one of protein, starch and fiber and having a composition different than the feed mixture, or
   wherein when said feed mixture comprises fish meal, bone meal, or meat and bone meal (MBM), one of the subfractions is enriched in protein and having a composition different than the feed mixture, and
c. operating the tribo-electrostatic belt separator to fractionate the feed mixture, the tribo-electrostatic belt separator comprising:
   i. a first electrode and a second electrode arranged on opposite sides of a longitudinal centerline and configured to provide an electric field between the first and second electrodes;
   ii. at least one first roller disposed at a first end of the separator
   iii. at least one second roller disposed at a second end of the separator;
   iv. a continuous belt disposed between the first and second electrodes and supported by the at least one first roller and the at least one second roller; and
   V. a separation zone defined by the continuous belt,
   wherein the continuous belt is operated at a belt speed of about 10 to about 25 feet per second.

2. The process described in claim 1, wherein the feed mixture comprises at least protein and starch, and wherein the protein includes gluten.

3. The process of claim 1, wherein the feed mixture has a protein content of at least about 35% dry matter (DM) basis.

4. The process of claim 1, wherein the protein level of one of the sub-fractions is enriched to be anywhere in the range of 25% to 46.5% DM, or 30-48% DM, or 52-62% DM, or 60-71.5% DM, or 55%-80% DM.

5. The process as claimed in claim 3, wherein the protein content of one of the subfractions is at least 5% greater than the protein content of the feed mixture on a dry matter basis.

6. The process as claimed in claim 1, wherein the feed mixture can be processed at a rate of anywhere in a range of 1000 to 20,000 kg per hour per meter of electrode width.

7. The process of claim 1, wherein there is an adjustment of feed moisture prior to separation by one of drying or wetting.

8. The process of claim 1, wherein an applied voltage can be anywhere in range between 3 kV and 20 kV.

9. The process of claim 1, wherein the gap between electrodes is continuously adjustable and can be varied anywhere in a range between 0.5 to 2.5 cm.

10. The process of claim 1, wherein the feed mixture comprises pulses (or legumes) including any of peas, lima beans, fava beans, lupin beans, and garbanzo beans.

11. The process of claim 1, wherein the feed mixture comprises oilseeds and meals prepared by removing oil from raw oilseed, including any of soybean, canola, rapeseed, sunflower, mustard, sesame, flaxseed, safflower, corn germ, and peanut.

12. The process of claim 8, wherein the voltage applied can be anywhere in range between 10 and 16 kV.

13. The process of claim 9, wherein the gap between electrodes is continuously adjustable and can be varied anywhere in a range between 0.9 to 1.7 cm.

* * * * *